(12) United States Patent
Li

(10) Patent No.: US 12,435,181 B2
(45) Date of Patent: Oct. 7, 2025

(54) FORMULATIONS CAPABLE OF REACTING WITH OR REMOVAL OF MOLECULAR OXYGEN

(71) Applicant: Shenshen Li, Plano, TX (US)

(72) Inventor: Shenshen Li, Plano, TX (US)

( * ) Notice: Subject to any disclaimer, the term of this patent is extended or adjusted under 35 U.S.C. 154(b) by 850 days.

(21) Appl. No.: 17/425,722

(22) PCT Filed: Jan. 27, 2020

(86) PCT No.: PCT/US2020/015209
§ 371 (c)(1),
(2) Date: Jul. 24, 2021

(87) PCT Pub. No.: WO2020/154728
PCT Pub. Date: Jul. 30, 2020

(65) Prior Publication Data
US 2022/0235174 A1    Jul. 28, 2022

Related U.S. Application Data

(60) Provisional application No. 62/797,269, filed on Jan. 26, 2019.

(51) Int. Cl.
| | | |
|---|---|---|
| *C08G 63/183* | (2006.01) | |
| *B29C 45/00* | (2006.01) | |
| *C08K 5/07* | (2006.01) | |
| *C08K 5/098* | (2006.01) | |
| *C08K 5/1545* | (2006.01) | |
| *C08K 5/18* | (2006.01) | |
| *C08K 5/20* | (2006.01) | |
| *C08K 5/32* | (2006.01) | |
| *C08K 5/435* | (2006.01) | |
| *B29K 33/04* | (2006.01) | |

(52) U.S. Cl.
CPC ........ *C08G 63/183* (2013.01); *B29C 45/0001* (2013.01); *C08K 5/07* (2013.01); *C08K 5/098* (2013.01); *C08K 5/1545* (2013.01); *C08K 5/18* (2013.01); *C08K 5/20* (2013.01); *C08K 5/32* (2013.01); *C08K 5/435* (2013.01); *B29K 2033/04* (2013.01)

(58) Field of Classification Search
CPC .... C08G 63/183; B29C 45/0001; C08K 5/07; C08K 5/098; C08K 5/1545; C08K 5/18; C08K 5/20; C08K 5/32; C08K 5/435; B29K 2033/04
USPC ....................................................... 528/280
See application file for complete search history.

(56) References Cited

U.S. PATENT DOCUMENTS

| | | | |
|---|---|---|---|
| 3,917,561 A | 11/1975 | Chapman et al. | |
| 4,059,533 A | 11/1977 | Watson et al. | |
| 4,073,861 A | 2/1978 | Cilento et al. | |
| 4,230,595 A | 10/1980 | Yamaji et al. | |
| 4,269,717 A | 5/1981 | Slovinsky | |
| 4,304,770 A | 12/1981 | Takaya et al. | |
| 4,317,742 A | 3/1982 | Yamaji et al. | |
| 4,363,734 A | 12/1982 | Slovinsky | |
| 4,389,327 A | 6/1983 | Rothgery et al. | |
| 4,419,327 A | 12/1983 | Kelly et al. | |
| 4,419,451 A | 12/1983 | Garner et al. | |
| 4,479,917 A | 10/1984 | Rothgery et al. | |
| 4,487,708 A | 12/1984 | Muccitelli | |
| 4,512,909 A | 4/1985 | Schiessl | |
| 4,541,932 A | 9/1985 | Muccitelli | |
| 4,549,968 A | 10/1985 | Muccitelli | |
| 4,569,783 A | 2/1986 | Muccitelli | |
| 4,634,539 A | 1/1987 | Fox et al. | |
| 4,657,740 A | 4/1987 | Feldman | |
| 4,693,866 A | 9/1987 | Feldman | |
| 4,734,258 A | 3/1988 | Cosper | |
| 4,769,175 A | 9/1988 | Inoue | |
| 4,891,141 A | 1/1990 | Christensen et al. | |
| 4,968,438 A | 11/1990 | Soderquist et al. | |

(Continued)

FOREIGN PATENT DOCUMENTS

| | | |
|---|---|---|
| CN | 102219742 A | 10/2011 |
| JP | 2005105249 A | 4/2005 |

(Continued)

OTHER PUBLICATIONS

Walling et al., "Oxidation of mandelic acid by Fenton's Reagent", J. Am. Chem.Soc. 1982, 104, 1185-1189. (Year: 1982).*
Gaikwad et al., "Oxygen scavenging films in food packaging", Environmental Chemistry Letters, (2018), 16:523-538. (Year: 2018).*
Beletskaya, Oxidation of N-benzylidenebenzylamine by oxygen through the formation of a carbanion, J. Org. Chem. USSR (Engl. Trans): (United States); 23:6; Translated from Zh. Org. Khim.; 23 (6), 1154-1157 (Jun. 1987).
International Search Report & Written Opinion dated Apr. 14, 2020 and International Preliminary Report on Patentability dated Feb. 11, 2021 for PCT/US2020/015209. 20 pages.

(Continued)

*Primary Examiner* — Ling Siu Cho
*Assistant Examiner* — Ronald Grinsted

(57) ABSTRACT

A composition includes a polymer, a functional component, and an oxidation catalyst. The functional component may be an oxidizable additive or a precursor thereof. The oxidizable additive includes an organic moiety including a first carbon atom (C1) attached to a hydrogen (H), a first group having a conjugated unit (a double bond, a triple bond, an aromatic ring); a second group having a heteroatom (including C═N, N═O, C═O, an O, a N, a fragment having at least three heteroatoms (including a N) within a spatial distance of 4 Å from C1); and a third group (hydrogen, an alkyl group, an aromatic group, a double bond, a triple bond, and a heteroatom). The C1 may be attached to a strong mesomeric electron-donating group and a strong mesomeric electron-withdrawing group; or to a conjugated group and a mesomeric group. The functional component may be derived from a recycled plastic article.

20 Claims, No Drawings

(56) References Cited

U.S. PATENT DOCUMENTS

| | | |
|---|---|---|
| 5,167,835 A | 12/1992 | Harder et al. |
| 5,176,849 A | 1/1993 | Hwa et al. |
| 5,194,478 A | 3/1993 | Frandsen et al. |
| 5,211,875 A | 5/1993 | Speer et al. |
| 5,244,600 A | 9/1993 | Cuisia et al. |
| 5,256,311 A | 10/1993 | Rossi et al. |
| 5,310,497 A | 5/1994 | Speer et al. |
| 5,346,644 A | 9/1994 | Speer et al. |
| 5,350,622 A | 9/1994 | Speer et al. |
| 5,387,368 A | 2/1995 | Nishimura et al. |
| 5,399,289 A | 3/1995 | Speer et al. |
| 5,425,896 A | 6/1995 | Speer et al. |
| 5,498,364 A | 3/1996 | Speer et al. |
| 5,529,833 A | 6/1996 | Speer et al. |
| 5,587,109 A | 12/1996 | Greaves et al. |
| 5,601,806 A | 2/1997 | Katsumoto et al. |
| 5,648,020 A | 7/1997 | Speer et al. |
| 5,660,736 A | 8/1997 | Bizot et al. |
| 5,660,761 A | 8/1997 | Katsumoto et al. |
| 5,686,016 A | 11/1997 | Veldman et al. |
| 5,700,554 A | 12/1997 | Speer et al. |
| 5,744,056 A | 4/1998 | Venkateshwaran et al. |
| 5,750,037 A | 5/1998 | Bizot et al. |
| 5,759,653 A | 6/1998 | Collette et al. |
| 5,776,361 A | 7/1998 | Katsumoto et al. |
| 5,798,055 A | 8/1998 | Blinka et al. |
| 5,804,236 A | 9/1998 | Frisk |
| 5,806,681 A | 9/1998 | Frisk |
| 5,811,027 A | 9/1998 | Speer et al. |
| 5,830,383 A | 11/1998 | Greaves et al. |
| 5,885,481 A | 3/1999 | Venkateshwaran et al. |
| 5,928,560 A | 7/1999 | DelDuca et al. |
| 5,942,297 A | 8/1999 | Speer et al. |
| 5,952,066 A | 9/1999 | Schmidt et al. |
| 5,977,212 A | 11/1999 | Ebner et al. |
| 5,981,676 A | 11/1999 | Gauthier et al. |
| 5,985,169 A | 11/1999 | Miller et al. |
| 5,989,440 A | 11/1999 | Shimura et al. |
| 5,993,688 A | 11/1999 | Blinka et al. |
| 6,027,687 A | 2/2000 | Nakajima et al. |
| 6,037,022 A | 3/2000 | Adur et al. |
| 6,086,786 A | 7/2000 | Blinka et al. |
| 6,139,770 A | 10/2000 | Katsumoto et al. |
| 6,143,197 A | 11/2000 | Gauthier et al. |
| 6,210,601 B1 | 4/2001 | Hottle et al. |
| 6,214,254 B1 | 4/2001 | Gauthier et al. |
| 6,228,284 B1 | 5/2001 | Ebner et al. |
| 6,233,907 B1 | 5/2001 | Cook et al. |
| 6,254,802 B1 | 7/2001 | Speer et al. |
| 6,255,248 B1 | 7/2001 | Bansleben et al. |
| 6,274,210 B1 | 8/2001 | Ebner et al. |
| 6,287,481 B1 | 9/2001 | Luthra et al. |
| 6,290,871 B1 | 9/2001 | Hottle et al. |
| 6,321,509 B1 | 11/2001 | DelDuca et al. |
| 6,333,087 B1 | 12/2001 | Jerdee et al. |
| 6,346,206 B1 | 2/2002 | Shimura et al. |
| 6,348,601 B2 | 2/2002 | Ohlbach et al. |
| 6,369,148 B2 | 4/2002 | Chiang et al. |
| 6,387,461 B1 | 5/2002 | Ebner et al. |
| 6,391,406 B1 | 5/2002 | Zenner et al. |
| 6,402,984 B1 | 6/2002 | Nakajima et al. |
| 6,406,644 B2 | 6/2002 | Jerdee et al. |
| 6,406,766 B1 | 6/2002 | Rotter et al. |
| 6,437,086 B1 | 8/2002 | Ching et al. |
| 6,449,923 B1 | 9/2002 | Cook et al. |
| 6,454,965 B1 | 9/2002 | Ching et al. |
| 6,455,620 B1 | 9/2002 | Cyr et al. |
| 6,464,896 B1 | 10/2002 | Speer et al. |
| 6,508,955 B1 | 1/2003 | DelDuca et al. |
| 6,527,976 B1 | 3/2003 | Cai et al. |
| 6,540,923 B2 | 4/2003 | Koizumi et al. |
| 6,569,506 B1 | 5/2003 | Jerdee et al. |
| 6,572,783 B1 | 6/2003 | Cai et al. |
| 6,607,795 B1 | 8/2003 | Yang et al. |
| 6,610,215 B1 | 8/2003 | Cai et al. |
| 6,610,772 B1 | 8/2003 | Clauberg et al. |
| 6,656,383 B1 | 12/2003 | Zenner et al. |
| 6,666,988 B2 | 12/2003 | DelDuca et al. |
| 6,680,094 B2 | 1/2004 | Kikuchi et al. |
| 6,682,791 B2 | 1/2004 | McKnight et al. |
| 6,746,622 B2 | 6/2004 | Yang et al. |
| 6,759,107 B1 | 7/2004 | Tai et al. |
| 6,777,479 B1 | 8/2004 | Bernard et al. |
| 6,861,032 B2 | 3/2005 | Shimura et al. |
| 6,863,988 B2 | 3/2005 | Tibbitt et al. |
| 6,872,451 B2 | 3/2005 | Ebner et al. |
| 6,911,122 B2 | 6/2005 | Cook et al. |
| 6,926,846 B1 | 8/2005 | DelDuca et al. |
| 6,942,821 B2 | 9/2005 | Dayrit et al. |
| 6,946,175 B2 | 9/2005 | Yang et al. |
| 7,014,898 B2 | 3/2006 | Ekman et al. |
| 7,022,258 B2 | 4/2006 | Yang et al. |
| 7,052,628 B2 | 5/2006 | Schmidt et al. |
| 7,078,100 B2 | 7/2006 | Ebner et al. |
| 7,147,799 B2 | 12/2006 | DelDuca et al. |
| 7,153,891 B2 | 12/2006 | Speer |
| 7,238,300 B2 | 7/2007 | Solis et al. |
| 7,258,930 B2 | 8/2007 | Rivett et al. |
| 7,399,425 B2 | 7/2008 | Ekkert et al. |
| 7,452,601 B2 | 11/2008 | Ebner et al. |
| 7,479,326 B2 | 1/2009 | Share et al. |
| 7,494,605 B2 | 2/2009 | Dayrit et al. |
| 7,504,045 B2 | 3/2009 | Speer et al. |
| 7,622,153 B2 | 11/2009 | Rollick et al. |
| 7,691,290 B2 | 4/2010 | Deshpande et al. |
| 7,704,407 B2 | 4/2010 | Makino et al. |
| 7,780,869 B2 | 8/2010 | Rollick et al. |
| 7,807,111 B2 | 10/2010 | Speer et al. |
| 7,816,008 B2 | 10/2010 | Ferrari et al. |
| 7,893,145 B2 | 2/2011 | Inubushi et al. |
| 7,985,456 B2 | 7/2011 | Stewart et al. |
| 7,994,245 B2 | 8/2011 | Deshpande et al. |
| 8,003,751 B2 | 8/2011 | Share et al. |
| 8,017,033 B2 | 9/2011 | Sugimoto et al. |
| 8,026,493 B2 | 9/2011 | Grossman et al. |
| 8,029,842 B2 | 10/2011 | Powers |
| 8,048,201 B2 | 11/2011 | Dukes et al. |
| 8,080,212 B2 | 12/2011 | Speer et al. |
| 8,097,662 B2 | 1/2012 | Schmidt et al. |
| 8,168,079 B2 | 5/2012 | Sugimoto et al. |
| 8,182,888 B2 | 5/2012 | Share et al. |
| 8,226,850 B1 | 7/2012 | Byun et al. |
| 8,277,892 B2 | 10/2012 | Rollick |
| 8,308,976 B2 | 11/2012 | Share et al. |
| 8,309,622 B2 | 11/2012 | Schmidt et al. |
| 8,409,680 B2 | 4/2013 | Knudsen et al. |
| 8,431,721 B2 | 4/2013 | Deshpande et al. |
| 8,476,400 B2 | 7/2013 | Joslin et al. |
| 8,562,861 B2 | 10/2013 | Share et al. |
| 8,592,522 B2 | 11/2013 | Komatsu et al. |
| 8,609,744 B2 | 12/2013 | Menozzi et al. |
| 8,629,220 B2 | 1/2014 | Prusty et al. |
| 8,721,920 B2 | 5/2014 | Deshpande et al. |
| 8,758,644 B2 | 6/2014 | Share et al. |
| 8,852,683 B2 | 10/2014 | Solovyov |
| 8,871,352 B2 | 10/2014 | Joslin et al. |
| 8,906,299 B2 | 12/2014 | Rule et al. |
| 9,018,284 B2 | 4/2015 | Akkapeddi et al. |
| 9,028,712 B2 | 5/2015 | Nakata |
| 9,068,113 B2 | 6/2015 | Akkapeddi et al. |
| 9,139,709 B2 | 9/2015 | Jamtvedt et al. |
| 9,156,940 B2 | 10/2015 | Evans et al. |
| 9,181,414 B2 | 11/2015 | Deshpande et al. |
| 9,193,847 B2 | 11/2015 | Kröhnke et al. |
| 9,260,596 B2 | 2/2016 | Kashiba et al. |
| 9,359,485 B2 | 6/2016 | Menozzi et al. |
| 9,441,066 B2 | 9/2016 | Menozzi et al. |
| 9,447,321 B2 | 9/2016 | Akkapeddi et al. |
| 9,475,630 B2 | 10/2016 | Deshpande et al. |
| 9,505,541 B2 | 11/2016 | Menozzi et al. |
| 9,593,239 B2 | 3/2017 | Knudsen et al. |
| 9,637,604 B2 | 5/2017 | Ito et al. |
| 9,764,308 B2 | 9/2017 | Yamada et al. |
| 9,775,911 B2 | 10/2017 | Bentley et al. |

(56) References Cited

U.S. PATENT DOCUMENTS

| | | | |
|---|---|---|---|
| 9,782,747 | B2 | 10/2017 | Hirose |
| 9,919,291 | B2 | 3/2018 | Yamada et al. |
| 10,040,922 | B2 | 8/2018 | Deshpande et al. |
| 10,125,096 | B2 | 11/2018 | Deshpande et al. |
| 10,131,481 | B2 | 11/2018 | Arakawa et al. |
| 10,207,853 | B2 | 2/2019 | Black et al. |
| 10,208,200 | B2 | 2/2019 | Akkapeddi et al. |
| 10,233,306 | B2 | 3/2019 | Sawa et al. |
| 10,351,692 | B2 | 7/2019 | Li et al. |
| 10,479,890 | B2 | 11/2019 | Ferrari et al. |
| 10,526,488 | B2 | 1/2020 | Ferrari et al. |
| 2004/0086733 | A1 | 5/2004 | Fujimori et al. |
| 2012/0199515 | A1* | 8/2012 | Peters ............... B29C 48/03 264/572 |
| 2012/0263974 | A1 | 10/2012 | Menozzi et al. |
| 2012/0276357 | A1 | 11/2012 | Soto-Valdez et al. |
| 2013/0266752 | A1 | 10/2013 | Deshpande |
| 2014/0228524 | A1 | 8/2014 | Deshpande |
| 2014/0262917 | A1 | 9/2014 | Share et al. |
| 2016/0052694 | A1 | 2/2016 | Li et al. |
| 2016/0083558 | A1 | 3/2016 | Li et al. |
| 2016/0137385 | A1 | 5/2016 | Li |
| 2017/0306143 | A1 | 10/2017 | Li |
| 2017/0313875 | A1 | 11/2017 | Li |
| 2018/0282046 | A1 | 10/2018 | Menozzi et al. |

FOREIGN PATENT DOCUMENTS

| | | |
|---|---|---|
| JP | 5088157 B2 | 12/2012 |
| WO | WO2010138569 A1 | 12/2010 |
| WO | WO2017/091602 A1 | 6/2017 |

OTHER PUBLICATIONS

Ken Suzuki, Studies on Catalytic Methods for Aerobic Oxidative Functionalization, Okayama University of Science (2013).

W. D. Powrie, Chemical Effects during Storage of Frozen Foods, Journal of Chemical Education, v61 n4 p. 340-47 Apr. 1984.

Bhosale et al., Chemistry of naphthalene diimides, Chem. Soc. Rev., 2008, 37, 331-342.

Allen et al., Aerobic Copper-Catalyzed Organic Reactions, Chem. Rev. 2013, 113, 6234-6458.

Gomes, et al., Cyclization-activated Prodrugs, Molecules 2007, 12, 2484-2506.

Duncan, Applications of nanotechnology in food packaging and food safety: Barrier materials, antimicrobials and sensors, J Colloid Interface Sci. Nov. 1, 2011;363(1):1-24.

Sakurai, The Electrolytic Reduction of Phthalimides, Part I., Bulletin of the Chemical Society of Japan 1930 5:6, 184-189.

Nielsen, et. al., Evaluation of Glycolamide Esters and Various Other Esters of Aspirin as True Aspirin Prodrugs, J. Med. Chem. 1989, 32, 727-734.

Greenfield, Hydrogenation of Benzonitrile to Dibenzylamine, Ind. Eng. Chem., Prod. Res. Dev., vol. 15, No. 2, 1976, 156.

Cruz, et al, Oxygen Scavengers: An Approach on Food Preservation, Structure and Function of Food Engineering, Chapter 2, ISBN: 978-953-51-4288-1, Copyright year: 2012.

Shaikh et al.,Iron-Catalyzed Enantioselective Hydrosilylation of Ketones, Angew. Chem. Int. Ed. 2008, 47, 2497-2501.

Wong, An Investigation of Redox-Active Isoindoline-Based Ligands and Their Coordination Complexes, Ph.D. Thesis, Simon Fraser University Spring 2012.

Linn, A Series of Pyromellitic Diimides That Improve the Efficiency of Rumen Fermentation, J. Agrlc. Food Chem. 1082, 30, 1236-1242.

Ju et al., Aqueous N-Heterocyclization of Primary Amines and Hydrazines with Dihalides: Microwave-Assisted Syntheses of N-Azacycloalkanes, Isoindole, Pyrazole, Pyrazolidine, and Phthalazine Derivatives, J. Org. Chem. 2006, 71, 135-141.

Janjarasskul, Triggering mechanisms for oxygen-scavenging function of ascorbic acid-incorporated whey protein isolate films, J Sci Food Agric (2013) 93(12), 2939-2944.

Malek, Reductions by Metal Alkoxyaluminum hydrides. Part II. Carboxylic Acids and Derivatives, Nitrogen Compounds, and Sulfur Compounds, In Organic Reactions, (Ed.). https://doi.org/10.1002/0471264180.or036.03.

Olah et al., End-Capped Poly(benzyl ethers): Acid and Base Stable Polymers That Depolymerize Rapidly from Head-to-Tail in Response to Specific Applied Signals, Macromolecules 2013 46 (15), 5924-5928.

Swamy et al., Mitsunobu and Related Reactions: Advances and Applications, Chem. Rev. 2009, 109, 2551-2651.

Singh et al., Aqueous-Mediated N-Alkylation of Amines, Eur. J. Org. Chem. 2007, 1369-1377.

Brotosudarmo et al., Structures of Astaxanthin and Their Consequences for Therapeutic Application. Int J Food Sci. Jul. 20, 2020;2020:2156582.

Strupinsky, Twenty-Year Retrospective on Plastics: Oxygen Barrier Packaging Materials, 1998 Polymers, Laminations & Coatings Conference Proceedings.

Sharma et al., Recent Advances in the Chemistry of Phthalimide Analogues and their Therapeutic Potential, Mini-Reviews in Medicinal Chemistry, 2010, 10, 678-704.

Connelly, Chemical Redox Agents for Organometallic Chemistry, Chem. Rev. 1996, 96, 877-910.

Zhou, et al., A Convenient and General Iron-Catalyzed Reduction of Amides to Amines, Angew. Chem. Int. Ed. 2009, 48, 9507-9510.

Adimurthy et al, A fast and highly efficient method for the synthesis of tertiary amines in aqueous medium, Indian Journal of Chemistry, 49B (2010), 771-775.

Wentzel et al., N-Hydroxyphthalimide/Cobalt(II) Catalyzed Low Temperature Benzylic Oxidation Using Molecular Oxygen, Tetrahedron, 56(39), 2000, 7797-7803.

Bennekom, Amide-modified poly(butylene terepthalate): thermal stability, Polymer 37(24), 1996, pp. 5447-5459.

Feghali et al, Catalytic chemical recycling of biodegradable polyesters, Polymer Degradation and Stability 179 (2020) 109241.

Lechner, The Co-rotating Twin-Screw Extruder for Reactive Extrusion, In Reactive Extrusion (eds G. Beyer and C. Hopmann). https://doi.org/10.1002/9783527801541.ch2.

Puglisi, Exchange ReactionMechanisms in the Reactive Extrusion of Condensation Polymers, In Reactive Extrusion (eds G. Beyer and C. Hopmann). https://doi.org/10.1002/9783527801541.ch6.

Mane et al, An efficient and greener protocol towards synthesis of unsymmetrical N,N'-biphenyl urea, Arabian Journal of Chemistry, 6(4), 2013, 423-427.

Zhang et al., Palladium(II)-Catalyzed ortho Alkylation of Benzoic Acids with Alkyl Halides, Angew. Chem. Int. Ed. 2009, 48, 6097-6100.

Newhouse et al., If C—H Bonds Could Talk: Selective C—H Bond Oxidation, Angew. Chem. Int. Ed. 2011, 50, 3362-3374.

Nguyen et al, An investigation into the supramolecular structure, solubility, stability and antioxidant activity of rutin/cyclodextrin inclusion complex, Food Chemistry 136 (2013) 186-192.

Nagarajan, et al., Antioxidant Activity of Synthetic Polymers of Phenolic Compounds, Polymers 2020, 12, 1646.

Michiels et al, Barriers and Chemistry in a Bottle: Mechanisms in Today's Oxygen Barriers for Tomorrow's Materials, Appl. Sci. 2017, 7, 665.

Ali, Syntheses of rigid-rod but degradable biopolyamides from itaconic acid with aromatic diamines, Polymer Degradation and Stability 109 (2014) 367-372.

Carnaroglio et al., One-pot sequential synthesis of isocyanates and urea derivatives via a microwave-assisted Staudinger-aza-Wittig reaction, Beilstein J. Org. Chem. 2013, 9, 2378-2386.

Blandez et al., N-Hydroxyphthalimide Anchored on Diamond Nanoparticles as a Selective Heterogeneous Metal-free Oxidation Catalyst of Benzylic Hydrocarbons and Cyclic Alkenes by Molecular $O_2$, ChemCatChem 2018, 10, 198.

Valgimigli et al., The Effect of Ring Nitrogen Atoms on the Homolytic Reactivity of Phenolic Compounds: Understanding the Radical-Scavenging Ability of 5-Pyrimidinols, Chem. Eur. J. 2003, 9, 4997-5010.

(56) References Cited

OTHER PUBLICATIONS

Coseri, Phthalimide-N-oxyl (PINO) Radical, a Powerful Catalytic Agent: Its Generation and Versatility Towards Various Organic Substrates', Catalysis Reviews, 51:2, 218-292.

Mishra et al., Synthesis of Phthalides through Tandem Rhodium-Catalyzed C—H Olefination and Annulation of Benzamides, Eur. J. Org. Chem. 2016, 3076-3083.

Gaikwad et al., Oxygen scavenging films in food packaging, Environmental Chemistry Letters (2018) 16:523-538.

Kankanala et al., Nimesulide Based Novel Glycolamide Esters: Their Design, Synthesis, and Pharmacological Evaluation, Journal of Chemistry (2013), Article ID 816769, 8 pages.

Holman et al., A Review of Patents for the Smart Packaging of Meat and Muscle-based Food Products, Recent Patents on Food, Nutrition & Agriculture, 2018, 9, 3-13.

Huy et al., Boron Lewis Acid Catalysis: How to Synthesize Amides Atom-Efficiently, Nachr. Chem. 2019, 67, 51-54.

Aeberli et al., Products obtained from the reaction of molecular oxygen with the sodium salts of 3-phenyloxindoles and 3-phenyl-2-coumaranone, J. Org. Chem. 1968, 33, 4, 1640-1643.

Frenette et al., Bond Dissociation Energies for Radical Dimers Derived from Highly Stabilized Carbon-Centered Radicals, Org. Lett. 2004, 6, 15, 2579-2582.

Jia et al., Catalytic Radical Cation Salt Induced Csp3-H Functionalization of Glycine Derivatives: Synthesis of Substituted Quinolines, Org. Lett., 2012, 14, 4030-4033.

Dhavalikar, Reactive Melt Modification of Polyethylene Terephthalate, Ph.D. Thesis, New Jersey Institute of Technology, 2003.

Pratt et. al., Substituent Effects on the Bond Dissociation Enthalpies of Aromatic Amines, J. Am. Chem. Soc. 2002, 124, 11085-11092.

Li et al, Synthesis of cyclic carbonates from urea and diols over metal oxides, Catalysis Today 115 (2006) 111-116.

Kapur et al., Toxicology of benzyl alcohols: a QSAR analysis, Chemosphere 41 (2000) 1643-1649.

Ishihara et al., 3,4,5-Trifluorobenzeneboronic Acid as an Extremely Active Amidation Catalyst. J Org Chem. Jun. 26, 1996;61(13):4196-4197.

Woldu, A novel relationship between the radical-scavenging activity of flavonoids and enthalpy of formation revealed with Hartree-Fock computations and thermochemical deduction, Redox Report, 2012, 17:3, 115-130.

Rivas et al., Synthesis and characterization of poly(o- and m-amino benzyl amine) and the copolymers with aniline. Study with Cu(II). J. Appl. Polym. Sci., (2004), 92: 31-36.

Hass et al., Polybenzyl Type Polymers, Journal of Polymer Science vol. XV, 503-514 (1955).

Baner et al, Preservation of Quality through Packaging. In Plastic Packaging (eds O.G. Piringer and A.L. Baner). (2008).

Urbach et. al., Copper Catalysed Oxygenation of Bis (2-pyridyl) methane and 6-Methyl-bis (2-pyridyl)methane to the Corresponding Ketones, Helvetica Chimica Acta 61(3):1097-1106.

Gangadasu, Base induced carbon-nitrogen (C=N) double bond migration in Schiff bases, Indian Journal of Chemistry—Section B, 44B(12) 2598-2600.

Powell et al., Copper-Catalyzed Amination of Primary Benzylic C—H Bonds with Primary and Secondary Sulfonamides, The Journal of Organic Chemistry 2010 75 (8), 2726-2729.

Takasu et al., Polyester Synthesis at Moderate Temperatures via the Direct Polycondensation of Dicarboxylic Acids and Diols Catalyzed by Rare-Earth Perfluoroalkanesulfonates and Bis(perfluoroalkanesulfonyl)imides, Macromolecules 2010 43 (1), 144-149.

Niwa et al., Carbon-carbon bond formations at the benzylic positions of N-benzylxanthone imines and N-benzyldi-1-naphthyl ketone imine, Tetrahedron 65 (2009) 5125-5131].

Cheng et al., Direct amidation of non-activated phenylacetic acid and benzylamine derivatives catalysed by $NiCl_2$, R. Soc. open sci. 2018(5): 171870.

Duncan, Novel methods for allylic amination by an intramolecular nitroso ene reaction, Ph.D. Thesis, Loughborough University 2013.

Pant et al., Gallic Acid as an Oxygen Scavenger in Bio-Based Multilayer Packaging Films, Materials 2017, 10, 489.

Orr et al., Homogeneous reactive coupling of terminally functional polymers, Polymer, 2001, 42(19), 8171-8178.

Harrington, Pharmaceutical Process Chemistry for Synthesis: Rethinking the Routes to Scale-Up, 2010, ISBN:9780470577554.

Lee et al., Ascorbic Acid-Based Oxygen Scavenger in Active Food Packaging System for Raw Meatloaf, Journal of Food Science, 2018, 83: 682-688.

Vitkauskienė et al., Glycolysis of industrial poly(ethylene terephthalate) waste directed to bis(hydroxyethylene) terephthalate and aromatic polyester polyols, Chemija 19(2), 29-34, Jan. 2008.

Campos et al., Synthesis, Characterization and Applications of Iron Oxide Nanoparticles—a Short Review, Journal of Aerospace Technology Management, vol. 7, No. 3, Jul.-Sep. 2015, pp. 267-276.

Luo, Comprehensive Handbook of Chemical Bond Energies (1st ed.) (2007).

Das, et. al., Selective Catalytic Monoreduction of Phthalimides and Imidazolidine-2,4-diones, Angew. Chem. Int. Ed. (2011), 50(39), 9180-9184.

Dong et al., Visible-Light-Induced Photocatalytic Aerobic Oxidation/Povarov Cyclization Reaction: Synthesis of Substituted Quinoline-Fused Lactones. J Org Chem. Oct. 7, 2016;81(19):8770-8776.

Han et al., Food Packaging: A Comprehensive Review and Future Trends. Compr Rev Food Sci Food Saf. Jul. 2018;17(4):860-877.

Yildirim et al., Active Packaging Applications for Food, Comprehensive Reviews in Food Science and Food Safety, 2018, 17:165.

Agriopoulou, Active Packaging for Food Applications, EC Nutrition 6.2 (2016): 86-87.

Fukushima et al., Advanced chemical recycling of poly(ethylene terephthalate) through organocatalytic aminolysis, Polym. Chem., 2013,4, 1610-1616.

Moad, Controlled Synthesis of Block Polyesters by Reactive Extrusion, Macromol. Symp. 2003, 202, 37-45.

Mohamed et al., Accessing the amide functionality by the mild and low-cost oxidation of imine, Tetrahedron Letters, 50(26), 2009, 3436-3438.

Witkop, Imine-Enamine Systems and the Mechanism of their Oxidation, J. Am. Chem. Soc. 1956, 78, 12, 2873-2882.

Emmons, The Preparation and Properties of Oxaziranes, J. Am. Chem. Soc. 1957, 79, 21, 5739-5754.

Layer, R.W. (1963) The Chemistry of Imines. Chemical Reviews, 63, 489-510.

Jalilian, Impact of MXD6 on the Structure and Properties of Mechanically Recycled PET Blends, Thesis at University of Toledo, Dec. 2017.

Kontominas, Effect of oxygen absorber, nitrogen flushing, packaging material oxygen transmission rate and storage conditions on quality retention of raw whole unpeeled almond kernels (*Prunus dulcis*), LWT—Food Science and Technology 43 (2010) 1-11.

Samperi, Characterization of Copolyesteramides from Reactive Blending of PET and MXD6 in the Molten State, Journal of Polymer Science, Part A, Polymer Chemistry, 48(22) 5135-5155.

Mathematik, Post-Consumer Poly(ethylene terephthalate)—Properties, Problems during Reprocessing, and Modification by Reactive Extrusion, thesis, Diese Dissertation ist auf den Internetseiten der Universitätsbibliothek verfügbar, Dec. 17, 2018.

Magliozzi, Benefit of the Reactive Extrusion in the Course of Polyhydroxyurethanes Synthesis by Aminolysis of Cyclic Carbonates, ACS Sustainable Chem. Eng. 2019, 7, 17282-17292.

Lee, Development of a Sulfite-Based Oxygen Scavenger and its Application in Kimchi, Packaging to Prevent Oxygen-mediated Deterioration of Kimchi Quality, Journal of Food Science, 83(12), 2018, 3009.

Wang et al, Radical Cation Salt-Promoted Catalytic Aerobic sp3 C—H Oxidation: Construction of Quinoline-Fused Lactones and Lactams, The Journal of Organic Chemistry 2015 80 (1), 609-614.

Ferdousi, Novel Approaches for Catalytic Direct Amide, Thesis, Durham University, (2015).

Karmakar et al., Phthalides and Phthalans: Synthetic Methodologies and Their Applications in the Total Synthesis, Chem. Rev. 2014, 114, 12, 6213-6284.

(56) References Cited

OTHER PUBLICATIONS

Nicolay et al., Synthesis of Multisegmented Degradable Polymers by Atom Transfer Radical Cross-Coupling, Macromolecules 2007, 40, 9217-9223.
Figueiredo et al., Nonclassical Routes for Amide Bond Formation, Chem. Rev. 2016, 116, 12029-12122.
Yoshioka et al, Conversion of a Used Poly(ethylene terephthalate) Bottle into Oxalic Acid and Terephthalic Acid by Oxygen Oxidation in Alkaline Solutions at Elevated Temperatures, Ind. Eng. Chem. Res. 2003, 42, 675-679.
Salamone et al., Electronic and Torsional Effects on Hydrogen Atom Transfer from Aliphatic C—H Bonds: A Kinetic Evaluation via Reaction with the Cumyloxyl Radical, J. Org. Chem. 2017, 82, 13542-13549.
Solis et al., Technologies for chemical recycling of household plastics—A technical review and TRL assessment, Waste Management 105 (2020) 128-138.
Giangiacomo et al., Ascorbic Acid and Glucose Oxidation by Ultraviolet A-generated Oxygen Free Radicals, Investigative Ophthalmology & Visual Science, Jul. 1996, vol. 37, No. 8, 1549.
Rivas et al., Synthesis and Characterization of Poly(o- and m-Amino Benzyl Amine) and the Copolymers with Aniline. Study with Cu(II), Journal of Applied Polymer Science, vol. 92, 31-36 (2004).
Plastic Packaging: Interactions with Food and Pharmaceuticals, Second Edition, Editor(s): Dr. Otto G. Piringer, Dr. Albert L. Baner, First published: Feb. 12, 2008, Print ISBN:9783527314553.
Allen et al., Metal-catalysed approaches to amide bond formation, Chem. Soc. Rev., 2011, 40, 3405-3415.
Hoang et al., Aminolysis of poly(ethylene terephthalate) waste with ethylenediamine and characterization of a,u-diamine products, Polymer Degradation and Stability 98 (2013) 697-708.
Mu et al., A nanosised oxygen scavenger: Preparation and antioxidant application to roasted sunflower seeds and walnuts, Food Chemistry 136 (2013) 245-250.
Cichello, Oxygen absorbers in food preservation: a review, J. Food Sci Technol (Apr. 2015) 52(4):1889-1895.
Zhu et al., Aminolysis-based surface modification of polyesters for biomedical applications, RSC Advances, 2013, 3, 2509.
Mohsin, Reactive Extrusion of Polyethylene Terephthalate Waste and Investigation of Its Thermal and Mechanical Properties after Treatment, International Journal of Chemical Engineering vol. 2017, Article ID 5361251, 10 pages.
Jang et al., Novel Direct Synthesis of Asymmetrical Urea Compounds from Trichloroethyl Carbamates Using Catalytic DBU, Bull. Korean Chem. Soc. 2017, vol. 38, 1515-1518.
Minisci et al., Transition metal salts catalysis in the aerobic oxidation of organic compounds Thermochemical and kinetic aspects and new synthetic developments in the presence of N-hydroxy-derivative catalysts, Journal of Molecular Catalysis A: Chemical 204-205 (2003) 63-90.
Paria, Reactivity of an Iron-Oxygen Oxidant Generated upon Oxidative Decarboxylation of Biomimetic Iron(II) α-Hydroxy Acid Complexes, Inorg. Chem. 2014, 53, 2810-2821.
Dilauro et al.,Reproducible and Scalable Synthesis of End-Cap-Functionalized Depolymerizable Poly(phthalaldehydes), Macromolecules 2013, 46, 2963-2968.
Naik, Crossing the Traditional Boundaries: Salen-Based Schiff Bases for Thermal Protective Applications, ACS Appl. Mater. Interfaces 2015, 7, 21208-21217.
Brody et al., Active packaging for food applications, CRC Press 2001, ISBN 1-58716-045-5.
Melone, Metal-free aerobic oxidations mediated by N-hydroxyphthalimide. A concise review, Beilstein J. Org. Chem. 2013, 9, 1296-1310.
Lednicer, The Organic Chemistry of Drug Synthesis, vol. 7, 2008 by John Wiley & Sons, Inc., ISBN 978-0-470-10750-8.
Guitard et al., Theoretical and Kinetic Tools for Selecting Effective Antioxidants: Application to the Protection of Omega-3 Oils with Natural and Synthetic Phenols, Int. J. Mol. Sci. 2016, 17, 1220.
Wasim Raja. et al., Innovations in Pharmaceutical Packaging—An Update, (2012) Int J of Ad Biomed & Pharm Res. 1(1): 29-39.
Zadbuke et al, Recent trends and future of pharmaceutical packaging technology. J Pharm Bioall Sci 2013;5:98-110.
Yang et al., Hydrothermal Photochemistry as a Mechanistic Tool in Organic Geochemistry: The Chemistry of Dibenzyl Ketone, J. Org. Chem. 2014, 79, 17, 7861-7871.
Dong et al., Visible-light-mediated Minisci C—H alkylation of heteroarenes with unactivated alkyl halides using O2 as an oxidant, Chem. Sci., 2019, 10, 976-982.
Luo Yuran, Chemical Bond Energies in Science Today and Applications, Nov. 31, 2008, University of Science and Technology of China Press, p. 41.
Jingwen He, Medicinal Chemistry, China's Light Industry Press, Jan. 31, 2016, p. 335.
Xu Wenda, Flexible packaging for food Technology—Modified Atmosphere Packaging, Active Packaging&Smart Packaging, Shanghai Science&Technology Press, p. Jan. 31, 2009, p. 166.
Yang Minbo, Plastic Molding Technology, China Light Industry Press, Jun. 30, 2014, p. 155.

* cited by examiner

FORMULATIONS CAPABLE OF REACTING WITH OR REMOVAL OF MOLECULAR OXYGEN

CROSS REFERENCE TO RELATED APPLICATIONS

This present application is a U.S. National Stage Application under 35 U.S.C. § 371 of International Application No. PCT/US2020/015209, filed Jan. 27, 2020, which claims priority to and the benefit of U.S. Provisional Application No. 62/797,269 filed Jan. 26, 2019, which is hereby incorporated by reference in its entirety as if fully set forth below and for all applicable purposes.

TECHNICAL FIELD

Embodiments of this present invention relate to formulations capable of reacting with or removal of molecular oxygen at ambient conditions. More specifically, embodiments of this present invention relate to formulations including oxidizable additives and optionally oxidation catalysts that react with molecular oxygen at ambient conditions for packaging and other related applications.

BACKGROUND

Plastics are light, durable and recyclable, thus providing enormous utility in daily life. Particularly, plastics are common packaging materials for various applications. Contents found inside containers utilizing plastics vary from food, beverage and drugs, to cleaning products, gasoline, motor oil and many others. However, for various oxygen sensitive materials, plain commercial plastics are often found to be insufficient to protect the contents of the container from oxidative degradation. This may be due to oxygen molecules that ingress from the surrounding environment into the packaging interacting with the content and causing oxidative degradations (or often called "spoilage"). Examples of the oxygen sensitive materials include certain food, beverage, pharmaceuticals, medical products, for human or for animals, electronic devices, corrodible metals or products and the like. The incapability of plain commercial plastics from sufficiently fending against the oxygen ingress may be due to the micro- or nano-sized pores that are present throughout their structures through which oxygen molecules may migrate in. While specialty plastics may be available to improve such barrier properties, their costs are often prohibitive. To overcome this problem, oxygen barrier additives are often utilized to impede such oxygen ingress. The types and amounts of the barrier additive required are determined by the contents of the packaging, their sensitivity towards oxygen, as well as the required shelf lives of the products.

There are primarily two types of oxygen barrier additives, namely passive barrier and active barrier. Passive barriers function by providing a physical barrier towards gas molecules like oxygen. The passive barriers may be used as a coating on the surfaces of the plastics once they are in their finished shape. Typical examples include carbon coating and silicon dioxide coating. In both cases, the coating material form a thin layer of dense material on top of the plastics to shield the plastics from being exposed to gas molecules. Alternatively, polymeric additives or nanocomposite additives may be doped as an additive into the plastics structures themselves, such that the additives forms road bumps, often in quasi-two-dimensional formats, towards the permeating gas molecules, thereby inhibiting their ingresses. The disadvantage of this approach includes, for example, that passive barriers cannot remove oxygen molecules that are introduced along with the content during or before the filling (or packaging) process. Moreover, coating-type passive barriers typically require very expensive capital investment in specialized instruments in order to conduct such coating processes. As a result, the adoption of such processes has so far not been widely accepted at the commercial level.

The second type of important barrier is so-called active barrier formulation. These formulations typically include an oxidizable molecule, whether discrete, oligomeric or even polymeric, whether inorganic or organic, that is oxidizable by molecular oxygen. This oxidizable molecule, once processed into a component of the container's plastic wall, reacts with the ingressed oxygen molecule before it permeates into the cavity of the container. This removes the oxygen before it reaches the content of the container thus largely prohibits the oxidative degradations of concern. However, because majority of the application of such packaging containers operate at room temperature, the formulation will only be functional if the reaction between oxygen and the oxidizable molecules can proceed efficiently at room temperature. Almost invariably so far, this requires the presence of an oxidation catalyst, such as a cobalt carboxylate, in the formulation to facilitate the oxidation reaction.

While existing machinery may be used to produce plastic packaging with active barriers, other challenges are present. First, the currently available formulations are comparably expensive and can only be used for higher-priced items. This has substantially limited the application of active barriers. In fact, there have been only a handful of products that entered the market in the past 30 years or so. This includes trade names of Amosorb®, Oxbar®, MonOxbar®, Diamond-Clear®, OxyClear®, HyGuard®, Ageless®, and others relying on the same basic composition. Breakthroughs in this space are rare. Even these brands are always under cost, anesthetic, and/or regulatory pressures. Without effective barrier materials, the brand owners have no choice but to resort to shorter-term solutions which inevitably lead to not only food/beverage waste, but also increasing plastics pollution. The market demand for new candidates of oxygen scavenging technology is high.

Perhaps more concerning is that discrete low molecular weight additives often found in active barrier formulations may migrate out from the polymeric matrices of the plastics walls and into the contents of the packaging. Thus, if the contents are purity-sensitive for health, hygiene, or other reasons, the amount of such additives that may be introduced into the packaging base resins often are very limited. Because a smaller initial concentration typically leads to a kinetically slower chemical reaction, the performance of the formulation against oxygen ingress is often also limited, at least at the beginning stage. While this concern may be partially mitigated by developing larger molecules or tethered molecules to reduce the mobility of the additives, other complications may occur. For example, large molecules such as polymeric molecules often cause inhomogeneity with the matrix plastics, such that colors, hazes or other undesirable visual characteristics are produced. Therefore, where transparency and colorlessness are important, such as in the case of food and beverage packaging, these active barrier formulations are not ideal without addressing the visual factor. Similarly, if the content is sensitive towards a light radiation of a certain color, the packaging is often designed to shield such color with a corresponding colorant. If the inhomogeneity caused by the active barrier leads to a distortion of color from that initially designed, it may be very difficult to compensate that distortion and bring the color back into brand owner's specifications.

Additionally, another source for migration hazard comes from the functioning of the active barrier formulation themselves. As described, these formulations function because the oxidizable component of the formulation reacts with oxygen. Such a reaction often leads to bond cleavages and produces degradants smaller than the original oxidizable component. Therefore, even when a polymeric additive is sufficiently immobile to avoid its own migration into and contamination of the contents inside the plastic containers, their oxidative degradation products, which increases and accumulates over the entire life of container, may eventually reach a threshold to cause legitimate concerns.

Furthermore, the functionality of the existing available active barrier formulations is still quite limited in various aspects. For example, an oxygen barrier additive may work with only a selection of available commercial plastics resins and does not work with the others. Additionally, an oxygen barrier formulation may work by itself or with only a selection of available commercial additives (e.g. dyes and pigments, UV-inhibitors, antimicrobial agents, anti-slip agent), but does not work, or only work with much lower efficacy when other additives are present.

Also importantly for food, beverage, drug or similar applications, the commercialization of a new formulation is a long process involving various regulatory stages. Toxicological studies will often eliminate otherwise competent candidates for commercialization. Accordingly, it is desirable to have a large selection of chemically functional candidates before going into the latter stages of commercialization. The presently available knowledge in this area have not been sufficient to meet such a need.

Therefore, there exists a clear need for a large selection of new, more effective, cheaper active barrier additives, or active barrier additives that are more compatible with base resins or additional additives, or that improves upon various other aspects of these present shortcomings. For example, this will help reduce food spoilage—one key cause for the global problem of food waste at 1.3 billion tons of edible food per year, and help maintaining food security and safety, among other benefits. Furthermore, improvements to other aspects of packaging application not described herein may also be desired. The objectives for embodiments of the present disclosure are to address one or more challenges (e.g. scavenging effectiveness, safety, clarity, color-indication, cost) discussed above and below.

DETAILED DESCRIPTIONS OF THE INVENTION

As discussed above, there have been a need for new and improved active barrier formulations. This is partly because of the deficiency of the several existing technologies noted above in this area of art. This invention provides various different embodiments, aspects, sub-aspects, examples and instances, each to address one or more of those deficiencies, but does not attempt to solve all of them. Particularly, this disclosure targets to provide chemically functional embodiments, but does not take into account toxicology effects of those described molecules.

It is noteworthy that many of the prior alleged solutions, such as various patents and patent applications, often describe (and claim) a much larger scope than that tested to be chemically functional for the described purpose. For those portions of the disclosures, the issue of enablement should be questioned and carefully evaluated. For example, there have been several functional oxidizable additives based on specific chemical structures that include a benzylic or allylic C—H functional group. Many of the patents and patent applications therefore leap from these specific structures to broadly allege that all molecules with benzylic or allylic C—H groups are active molecules. These disclosures, whether or not enabling for those specific chemical structures claimed, are not enabling prior art with respect to all other molecules containing such functional groups. Indeed, it is well recognized in this industry that many molecules having merely benzylic C—H or allylic C—H do not function for the purpose of active barrier additive. Notably, the specifications of these patents or patent applications invariably fail to provide sufficient embodiments to support those broad assertions.

Such a problem, arguably prevalent in this area of art, may have originated from a lack of appreciation of details of the specific reaction of concern, that is, oxidization reaction of an oxidizable molecule by dilute molecular oxygen at an ambient temperature in a solid polymeric matrix. In contrast, numerous scientific literatures describe similar oxidization reactions that differ in one or more important aspects. For example, vast majority of the scientific literature discuss reactions utilizing pure oxygen as a reactant, at elevated temperatures, in presence of specialized catalysts outside the scope of those disclosures, or performed in liquid phases. It is well understood that reactivities critically depend on actual conditions. Therefore, those numerous literature may have been relied upon to make the afore-mentioned improper generalizations cannot sufficiently support the described scope of those patents and patent applications.

Similarly unsupported assertions with regards to other functional groups as active oxidizable additives can also be found in the patents and patent applications, which include, for example, unsaturated polyolefins, amines, polyamines, amides, polyamides, ethers, molecules with tertiary C—H bonds, polyalkyleneglycols, and any other molecules with a homolytic C—H bond dissociation energy of less than or equal to about 93 kcal/mol. While the presence of these functional groups may not necessarily preclude a molecule as an oxidizable additive, their mere presence does not indicate their activities. Other functional groups, or the co-presence of other functional groups, are often necessary. Those broad assertions in the earlier literature can be disapproved by a simple experiment. Additionally, some of these prior alleged solutions includes or produces byproducts that makes them inappropriate for the intended applications. For example, some produce small molecules, such as aldehydes, which makes them inappropriate for certain applications, such as food and/or beverage applications. For example, some cause hazes which makes them anesthetically unpleasing for marketing purposes. For example, some cause processing difficulty, such as screw slippery in injection and/or extrusion operations. Therefore, while existing technologies may satisfy certain present demands, they are not perfect in every aspect and require further improvements.

The current invention provides many embodiments based on benzylic or allylic C—H, as well as many additional embodiments that do not rely on benzylic or allylic C—H to function as an active barrier formulation. In some embodiments, a single functional group provides the functionality. In some other embodiments, more than one functional group work synergistically to provide the functionality. For example, a mesomeric group and a conjugated group work synergistically, an electron-withdrawing group and an electron-donating group, two mesomeric groups, and/or two conjugated groups work synergistically to provide the functionality. The present disclosure provides many embodiments, aspects, sub-aspects, examples, instances, and so on. These terminologies are used merely for the ease of organization and description. They shall all be interpreted as non-exclusive examples with varying breadths of coverage. They shall not be construed to be exhaustive. Additional embodiments, aspects, sub-aspects, examples, instances, and so on shall be construed to be within the scope of the disclosure if a personal having ordinary skill in the art can reasonably infer those from the provided disclosure, embodiments, aspects, sub-aspects, examples, instances, and so on.

In describing the embodiments, aspects, sub-aspects, examples, and instances, it is to be understood that all spatial (or stereo-) isomers, tautomers (isomers merely involving shifting of hydrogen atoms), and structural isomers that do not involve change of the identities or bonding sequences of functional groups, are within the scope of disclosure if one of these isomers is disclosed in the specification, unless specifically noted otherwise. Therefore, unless clearly specified, a disclosure of a molecule with atomic groups in a cis-configuration around a double bond also discloses the molecule with atomic groups in a trans-configuration around the double bond; disclosure of a molecule with one stereoisomer discloses all other stereoisomers as well. In contrast, a disclosure of a molecule including a toluene backbone with an additional substituent on the meta-position relative to the toluene methyl does not automatically disclose toluene with a substituent on the para- or ortho-positions relative to the toluene methyl, unless specified otherwise. This is because toluene with the substitution on different positions does involve change of the bonding sequence of functional groups. However, a disclosure of such a substituted toluene without specifying meta-, para-, or ortho-configurations shall be construed to cover all these patterns. Also, disclosed functional groups may be substituted or unsubstituted unless otherwise specified.

It is to be understood that all embodiments, aspects, sub-aspects, examples and instances provided here, unless specified otherwise, are devoid of, and do not produce, a sufficient amount of free labile fragment(s) that inhibits the concerned reactivity of the oxidizable additive and/or the reactivity associated with a necessary catalyst, or such an inhibition is remediated. The term "free labile" means that the fragment may be cleaved off during the processing and/or application of the composition of the embodiment and may be free to migrate to combine with the catalyst (hence called "catalyst-deactivating unit") and/or other portions of the oxidizable additive, thereby causing the inhibition. One example of remediation method for such inhibition effect is to use inert metal ions or compounds to scavenge and combine with such labile fragments so that they are not free to interact with active species (such as the oxidizable additive or the active oxidation catalyst).

Furthermore, it is to be understood that a disclosure of a monovalent —R—H group also discloses a divalent —R— group, such as a compound with a ring including —R—, vice versa, unless a chemical formula (generic or specific) indicates that the presence or absence of the —H. In certain situations, cyclic compounds may be preferable for various reasons. For example, cyclic compounds are more resistant to be cleaved into smaller fragments, or the extra ring mandates certain configuration of the compound which is beneficial. In other situations, cyclic compounds may be less preferable. For example, the extra ring causes strain which leads to unfavorable energetics; or the extra ring causes inaccessibility to the active site; or the extra ring mandates certain configuration of the compound which is undesirable. Additionally, a disclosure providing one molecule also discloses all polymeric molecules that derives from the molecule as a monomer or a co-monomer. The concentration of the molecule or co-monomer fragment in the polymeric molecules are of criticality. If the concentration is too high, the rheology of the polymer composition may be substantially change to cause processing difficulty, and additional risks associated with the migration of the additive and/or degradants may increase. If the concentration is too low, the effectiveness may be minimal. The proper concentration may be determined by routine experimentation, as described later. Likewise, if the disclosure provides a molecule, any derivatives, encapsulates, dendrimers, host-guest complexes, supramolecular complexes, of the molecule, either as a moiety covalently bound, ionically bound, datively bound, or not bound, are also within the scope of the disclosure, provided that the presence of the encapsulating species, additional functional groups, host, or guest species are not inhibiting to the oxygen scavenging reaction. For example, an encapsulating species that could chelate with a necessary metal catalyst (e.g. Co(II)) should not be used. The term "polymer" includes oligomers unless otherwise stated. So, for example, polyethylene glycol includes oligoethylene glycol.

The disclosure below recites various terms. The term "organometallic" shall be construed to encompass metalloids like boron, silicon, and tin in addition to other metals. Unless otherwise stated, the term "organic" includes "organometallic" provided that the metal is spaced away from the atom to which the organic component is attached by at least two bonds. The term "part," "moiety," "fragment," "unit," and "residue" shall be construed to be interchangeable with each other and to mean a part of a molecule or a molecular system. The disclosure of any component, ingredient, member, constituents, or the like, of a composition discloses that component, ingredient, member, constituent in pure form (unless otherwise stated). Therefore, for example, disclosure of a polymer do not encompass the polymer with residue catalyst remaining in the polymer matrix. The disclosure below also recites "proximity" to describe spatial relationship between different parts of a molecule or a molecular system (hereinafter collectively "molecule"). This term shall be interpreted to include both the embodiment in which the different parts are directly bonded together, and the embodiment in which the different parts electronically communicate with each other and are spatially close to each other within a certain threshold but not directly bonded. For example, the disclosure may provide a molecule involving a carbon center (C1) in proximity with a moiety R1. This shall be interpreted to mean that, in the natural ground state of the molecule, the atom of interest within the first moiety R1, denoted as A1, is within a certain threshold of direct point-to-point distance from C1. The atom of interest A1 is the atom that embodies most of the concerned effect of R1 towards C1. For example, if an electron-donating effect to C1 is of concern, A1 is selected to be the atom that has the strongest electron-donating effect on C1, such as the closest atom to C1 that has a free lone pair. For another example, if electron-withdrawing effect to C1 is of concern, A1 is selected to be the atom having the strongest electron-withdrawing effect on C1. The threshold is determined based on the identity of the A1 atom and is evaluated based on equivalents to certain numbers of typical A1—C single bond length in organic or organometallic molecules. A1 and C may be directly bonded or not bonded. Alternatively, the term "proximity" may also be interpreted to mean that, in the natural ground state of the molecule, A1 is within a certain threshold of direct point-to-point distance from the hydrogen atom attached to C1 and closest to A1. The threshold is determined based on the identity of the A1 atom and is evaluated based on equivalents to certain numbers of typical A1—H bond length in organic or organometallic molecules. These typical bond lengths may be those provided by common chemistry textbooks, CCBDB database of experimental bond lengths from NIST, or properly computed by the state of art computational chemistry. For example, a typical C—H bond is 1.09 Å; while a typical O—H bond is 0.97 A. For another example, a hydrogen bond distance is useful. A strong hydrogen bond has distances of 2.2-2.5 Å; a moderate hydrogen bond has distances of 2.5-3.2 Å; and a weak hydrogen bond has distances of 3.2-4.0 Å. In one aspect, C1 and A1 are directly bonded with each other; in another aspect, C1 and A1 are covalently bonded via a plurality of bonds; alternatively, there may be no direct bond between C1 and A1. In a one aspect, direct bonding is preferred due to the stronger interactions between C1 and R1; while in another aspect, the absence of bonding is preferred due to various reasons, such as to leave open direct bonding sites for other necessary substituents, or to provide the flexibility of arranging multiple moieties around the C1 center without causing large strains, etc. The spatial distances may be measured by any known method, for example, crystallography and computational chemistry.

The disclosure below also describes various types of electronic communications. These communications may be through-bond or through-space. Having a covalent bond between two moieties is one example of electronic communication. Ionic and electrostatic effects, electronic, spin, radical delocalization and polarization, conjugation, hyperconjugation, steric effects, coordinative or dative interactions are also electronic communications. Particularly, this disclosure describes the effects of electron-withdrawing or electron-donating effects. For example, this disclosure describes electron-withdrawing groups ("EWG"), or electron-donating group ("EDG") with respect to a certain carbon atom. These terminologies are used in reference to the carbon atom and the hydrogen atoms attached to the carbon atom. The same group may have other or even opposite effect to a different atom it attaches to. For example, an ester carboxylate group (—$C^a$(=$O^a$)—$O^b$—) attached to C1 with $C^a$ and to C2 with $O^b$ is typically an EWG to C1 but an EDG to C2.

Additionally, the designation of EWG or EDG may change based on chemical environment of the substituent, especially for weak-effect substituents. For example, vinyl group is generally regarded as a weak EDG when it is free of any substituent on itself; but it may be regarded as a weak EWG when it bears electron withdrawing groups such as halogens, nitro, cyano, and the like.

Furthermore, the EWG effect or EDG effect may either be of a mesomeric nature or of an inductive nature. Unless specified, an EWG substituent shall be construed to encompass any substituents that has either a mesomeric EWG effect or an inductive EWG effect, whether or not that particular effect is the dominating effect of the substituent. For example, cyano group (—CN) has both mesomeric electron-withdrawing property and inductive electron-withdrawing property. Therefore, cyano group is encompassed by the designations of EWG, mesomeric EWG and inductive EWG. For another example, cyanomethyl (—CH2CN) only has inductive electron-withdrawing property. So it is encompassed by the designations of EWG and inductive EWG. For a further example, amino (—$NH_2$) has both inductive electron-withdrawing property and mesomeric electron-donating property. It is encompassed by the designations of EWG, EDG, inductive EWG and mesomeric EDG. For yet a further example, isocyanate and isothiocyanate each has both inductive electron-withdrawing property and mesomeric electron-donating property. In other words, one substituent may possess simultaneously two or more substituent effects. Generally, aromatic groups (including heteroaromatic groups), other conjugated groups, as well as heteroatoms (e.g. O, N, S, etc.) have some mesomeric EDG or EWG effects; and some of them may simulataneously have some inductive EDG or EWG effects.

Different EWGs and EDGs have different strengths. A "moderate mesomeric EWG" refers to an EWG that has a mesomeric electron-withdrawing effect that is similar to that of an aldehyde (—CHO) group, a ketone (—COR) group, a carboxylic acid (—COOH) group, an acyl chloride (—COCl) group, an esters (—COOR) group, and an amide (—$CONH_2$) group. A "strong mesomeric EWG" refers to an EWG that has a mesomeric electron-withdrawing effect that is stronger than those of a moderate mesomeric EWG. For example, a strong mesomeric EWG may be a cyano (CN) group, a triflyl (—$SO_2CF_3$) group, a sulfonate (—$SO_3H$) group, a nitro (—$NO_2$) group, etc.. A "weak mesomeric EWG" refers to an EWG that has a mesomeric electron-withdrawing effect that is weaker than those of the moderate mesomeric EWG. A "moderate mesomeric EDG" refers to an EDG that has a mesomeric electron-donating effect that is similar to that of an amide (—NHCOR) group and an ester (—OCOR) group. A "strong mesomeric EDG" refers to an EDG that has a mesomeric electron-donating effect that is stronger than those of a moderate mesomeric EDG. For example, a strong mesomeric EDG may be a phenoxide (—$O^-$) group, an amine (—$NR_2$, —NHR, —$NH_2$) group, an ether (—OR) group, and a hydroxy (—OH) group, etc. A weak mesomeric EDG may be any EDGs that are weaker than the moderate mesomeric EDG. A "moderate inductive EDG" refers to an EDG that has an inductive electron-donating group effect that is similar to that of a carboxylate anion (—$COO^-$). A "strong inductive EDG" refers to an EDG that has an inductive electron-donating effect that is stronger than those of a moderate inductive EDG. For example, a strong inductive EDG may be trihydroxy boron (—$B(OH)_3$), a divalent butyl group (—$(CH_2)_4$—), a divalent propyl group (—$(CH_2)_3$—). A "weak inductive EDG" refers to an EDG that has an inductive electron-donating effect that is weaker than those of a moderate inductive EDG. A "moderate inductive EWG" refers to an EWG that has an inductive electron-withdrawing group effect that is similar to that of a carboxylic acid (—COOH) group, a hydroxy (—OH) group, an ether (—OR) group, an amine (—$NR_2$, —NHR, —$NH_2$) group. A "strong inductive EWG" refers to an EWG that has an inductive electron-withdrawing effect that is stronger than those of a moderate inductive EWG. For example, a strong inductive EWG may be cyano (CN) group, a nitro (—$NO_2$) group, a nitrosyl (—NO) group, an ammonium (—$NH_3^+$, —$NR_3^+$) group, etc.. A "weak inductive EDG" refers to an EDG that has an inductive electron-donating effect that is weaker than those of a moderate inductive EDG.

Additionally, the disclosure describes "conjugated groups" or "conjugated units." These terms shall be construed broadly to encompass traditional aromatic groups, simple double bonds, simple triple bonds or the combinations thereof. Note that the term "double bond" and "triple bond" refers to a chemical group having not only the bond, but also the atoms the bond immediately connects, unless otherwise stated. Therefore, for example, the phrase "a first atom $A_1$ connected to a double bond" refers to $A_1$–X=Y rather than $A_1$=X, where X and Y are any atoms. Embodiments of conjugated groups may include only carbon or may include heteroatoms. Heteroatom includes, for example, O, N, P, S, Si. The terms "conjugated group" and "conjugated unit" may further include hyperconjugation when the electron delocalization effect is of a magnitude not negligible, for example, when a lone pair is involved. Therefore, for example, benzoic acid includes a conjugated group that extends not only to the benzene ring, the C=O, but also the hydroxy oxygen atom. However, a σ-bonded carbon atom to a double bond or benzene ring does not have delocalization effect of such a magnitude, and should not be considered a "conjugated group." Also, it is to be understood that conjugation is inherently a mesomeric effect. Therefore, all conjugated groups may also be designated as either EWG/mesomeric EWG or EDG/mesomeric EDG. Additionally, when the conjugated group include heteroatoms, inductive effect may be present. For example, 2-pyridyl is an inductive electron-withdrawing group due to the close proximity of an electronegative atom (N). At the same time, it is also a mesomeric electron-donating group. In other words, 2-pyridyl is encompassed by designations of conjugated group, EDG, EWG, inductive EWG and mesomeric EDG. It is further to be understood that in providing a certain chemical structure, a drawing or a formula presented in different ways may be for a same molecule. For example, —COR, —C(=O)R, and —C(=O)—R all illustrate a carbonyl group attached to a residue R.

The disclosure also describes homolytic bond dissociation energies (BDE). Homolytic BDE (or abbreviated herein as BDE) is one measure of the strength of a chemical bond, such as that of A-B. It is defined as the standard enthalpy change when A-B is cleaved by homolysis to give radical fragments A· and B·. This parameter is temperature dependent. Unless otherwise specified, the BDE described in this disclosure are BDEs at 298 K. Any suitable experimental techniques available to a person of ordinary skill in the art may be used to determine BDE. These techniques include, for example, spectrometric determination of energy levels, generation of radicals by pyrolysis or photolysis, measurements of chemical kinetics and equilibrium, various calorimetric and electrochemical methods, and derivations from known data based on the first law of thermodynamics, as well as quantum chemistry computations. It is to be understood that bond dissociation energy measurements are challenging and are subject to considerable error. According to *Comprehensive handbook of chemical bond energies*, Luo Y R (2007), Boca Raton: CRC Press, ISBN 978-0-8493-7366-4, OCLC 76961295 ("Luo"), the majority of currently known values are accurate to within ±1 or 2 kcal/mol, while values measured in the past, especially before the 1970s, can be especially unreliable and have been subject to revisions on the order of 10 kcal/mol. The BDE numbers provided here for specific molecules or fragments shall be construed as BDEs measured by the most accurate method available to the inventor, to the best ability of the inventor, although subject to experimental errors. The experimental errors may include systematic errors for, e.g. the method used and disclosed, as well as accidental error for specific molecules. Additionally, thermal fluctuation provides minor but additional uncertainty. The magnitude of this uncertainty is dependent on the temperature of the application. At room temperature, it is about 0.59 kcal/mol. The various BDE numbers provided here as thresholds should be construed to be true BDEs, subject only to the systematic error and thermal fluctuations at the application temperature. A person of skill in the art shall use the most accurate method available to date to determine the BDE in using this disclosure.

The disclosure further discloses energy gaps and strains. Each molecule has an internal energy that consists of all the energy stored within the molecule. The difference in internal energies of related species, such as a molecule R—H and its radical R·, may be evaluated as energy gaps. The significance of the energy gap will become apparent to a person having ordinary skill in the art reading the subsequent sections. When each atom of a molecule is in their preferred geometry, the molecule has its lowest internal energy and is considered to be in its natural ground state. When the molecule interacts with its environment or when it undergoes certain transformations, such as bond formation, bond cleavage, formation of transition state, etc., the atoms involved often are forced into a less preferred geometry. This causes the internal energy of the molecule to be raised. The amount of extra internal energy, or "strain" energy, is somewhat like the energy stored in a compressed spring. The strain may be categorized into steric strains or Van de Waals strains, torsional strains, and ring strains. Often times, more than one type of strain occur simultaneously. Further notably, while strain increases internal energy of the molecule, in certain situations, additional energy factors, such as delocalization, may cause the internal energy of the molecule to drop simultaneously. Therefore, the overall internal energy of the molecule may not necessarily increase. Strains, energy gaps, and other energy factors may be measured in the units of energy, such as kcal/mol, by any suitable experimental techniques available to a person of ordinary skill in the art. These techniques include, for example, spectrometric determination of energy levels, generation of radicals by pyrolysis or photolysis, measurements of chemical kinetics and equilibrium, and various calorimetric and electrochemical methods, as well as quantum chemistry computations.

It is to be understood that different applications may require different levels of oxygen scavenging activity. Therefore, it may be desirable to have a numeric measure for the predicted activity to facilitate comparisons and selections. Oxidation Reactivity Index (OI) and Overall Oxidation Reactivity Index (OOI) are two measures of oxygen scavenging capability. Of these two indices, OI takes into account the properties of different fragments of the molecule as related to oxygen reactivity, such as the electron-donating effect, electron-withdrawing effect, steric effect, conjugation effect, certain interaction with catalysts; and OOI evaluates the molecule as a whole as relevant to oxygen scavenging capabilities. Both these indexes for various specific molecules and functional groups are under current development. They will be released, as they become available, at the website known by the URL "https:sites.google.com/site/o2scavenger/". If this website address becomes unavailable due to, such as, changes of provider's offerings, an alternative website address will be provided at the inventor's LinkedIn profile.

It is also to be understood that the selection of active barriers often depends on the specific application contexts. For example, for packaging applications using primarily polyethylene terephthalate (PET) resins and when clarity is important, an additive that includes primarily saturated C—C bonds may not be appropriate for aesthetic reasons as they tend to induce hazes or colors. For another example, certain chemically functional active barrier formulations may not be appropriate for food, beverage or drug packaging, if one or more of its components, or the degradation products thereof, contain unacceptable toxicology effects. The term "pharmaceutically acceptable" refers to those compositions which are, within the scope of sound medical judgment, suitable for use in contact with the tissues of humans and lower animals without undue toxicity, irritation, allergic response and the like, and are commensurate with a reasonable benefit/risk ratio. Pharmaceutically acceptable compositions are well known in the art. For example, pharmaceutically acceptable salts are described in detail in S. M. Berge et al., J. Pharmaceutical Sciences, 1977, 66, 1-19 ("Berge"), incorporated herein by reference. Similarly, "food and/or beverage contact acceptable" refers to those compositions which are, within the scope of sound medical judgment, suitable for use in contact with food and/or beverages without causing undue toxicity, irritation, allergic response and the like related to the ingestion of the food and/or beverage, and are commensurate with a reasonable benefit/risk ratio.

It is also to be understood that while the embodiments described below focus on active oxygen barrier formulations, such active oxygen barrier formulation may include additional functionalities, such as being a passive barrier at the same time (such that it functions to not only impede oxygen ingress, but also impede, in for example beer applications, carbon dioxide loss from inside the container). Also, the various embodiments provided may be implemented as a single-layer packaging material, or may be implemented as one of the inner layers of a multi-layer packaging material, or one of the outer layers of a multi-layer packaging material. The packaging application may be rigid containers, or may be flexible packaging.

Additionally, these formulations may be used in relevant but different contexts. For example, sachets or inserts, cap liner, sealants or the like that contain the disclosed formulations may be introduced into the cavity of the container separate from the container molding or forming processes. They may also be provided as part of a closure to the container. In addition to impede oxygen ingress, these sachets or inserts may also be used to scavenge oxygen contained inside the packaging immediately following filling of the contents (as opposed to impede oxygen ingress over time from the outside of packaging). For another example, plastics with the disclosed formulations may be used as coatings inside or outside other types of containers to provide better functionality with respect to oxygen scavenging, color indication or other relevant characteristics. Even furthermore, while this disclosure is provided in the context of packaging applications, it is to be understood that the concepts apply to all other types of reactions provided that the reactive environment of the other applications are similar in relevant aspects, for example, reactions at ambient temperature in solid states within atmospheric environment.

These varying contexts of application determines the amount of the oxidizable additive to be used. The oxygen sensitivity of the protected content is another crucial consideration. In applications for food and beverage plastics additives, for example, the amount is typically between 0.1% to 30%. If the amount is too small, such as less than 0.1%, the effectiveness will be minimal; if the amount is too large, increased risk associated with the migration or degrade of the additives themselves may become more problematic. For applications as an oxygen absorber, the amount may be between 0.01% to 100%.

The disclosure below also describes catalysts. Unless otherwise specified, the catalysts are present in the composition at a catalytically effective amount, that is, at an amount sufficient to substantially affect the rate of chemical reaction in question (for example, an oxidation, hydrolysis, transesterification, or transesteramidation reaction, etc.) The disclosure also describes precursors to oxidative additives. This term refers to one or more reactants from which the oxidative additives form, under the regular processing condition of the composition. Therefore, where A and B react under a certain condition to form oxidizable additive C, A, B, and combination thereof are each a precursor to C if, and only if, the certain condition is one typical to the processing of A, B, and/or C. Otherwise, none is a precursor to C.

In addition to providing active barrier solutions, this disclosure also provides various other additional methods, matters, and compositions inside or outside packaging art. In one aspect, the disclosure provides novel synthetic procedures for several relevant additive molecules herein described. These synthetic procedures have additional utilities beyond what has been so-far described and shall be so construed and applied. For example, the disclosure provides that production of certain active barrier additives may start from a recycled plastics material as a starting material as opposed to traditionally sourced raw chemical. Such a method for synthesis of that additive alone, without regard to applications, constitutes a method of plastics recycling having sustainability and environmental remediations impacts. Such a method may be applied by a person having ordinary skill in those different arts and outside the area of active barrier packaging. Similarly, this disclosure provides examples in which the oxidizable additive changes color as it reacts with oxygen and degrades as a result. This provides a color-indicator for the shelf-life for the packaging with respect to oxygen barrier effectiveness. Furthermore, this disclosure provides examples of a method of improving transparency of polyesters when condensation polymers are used as a component of the barrier formulation. Still furthermore, certain ammonium cation-based oxygen scavenger disclosed herein may be applied to simultaneously address anti-microbial needs; and some triazine-based oxygen scavenger may be applied to address UV-blocking needs. In some examples, these simultaneous applications interact with each other to alter the effect of oxygen scavenging. Even further, this disclosure provides a method of reactive extrusion which may be used in a variety of other applications involving condensation polymers. These practical aspects of the invention shall not be limited to the applications of barrier packaging, but may be extended to any similar or related applications that involves similar or related issues.

With respect to color-indicator for the shelf-life with respect to oxygen barrier effectiveness, various examples below provide representative molecules whose structures change as response to interaction with oxygen molecules. Without being limited by theory, these structural changes usually involve extension or break-down of the conjugation systems of the molecules thereby changing the way the molecule interacts with light. One consequence is that the product molecule following the reaction with oxygen will typically absorb a light radiation that is of a different wavelength than the unreacted molecule does. Another consequence is that the product molecule may provide an emission that the unreacted molecule does not provide, or an emission at a wavelength different from that provided by the unreacted molecule. If such absorption or emission is within the visible light region, for example, between 400 nm and 700 nm, the color change of the oxidizable additive will be noticeable by human eyes. Because the color changes are the direct result of the consumption of the oxidizable additive via its reaction with oxygen, such color change is directly related to the then-available concentration of the additive present in the system, which in turn may be related to the expected shelf life. Even when the light radiation of the absorption or emission is outside the visible light region, spectrometers or other instruments may be used to detect such change in concentrations of the additive thereby provide indication for remaining shelf-life. Because emission is typically more characteristic and less prone to interference, utilization of emission (such as fluorescence and phosphorescence) is preferred.

Generally, the active barrier formulation includes an oxidizable additive and an oxidation catalyst. The catalyst may be optional when the oxidizable additive has a sufficiently high activity, as described below.

Oxdizable Additive

Surprisingly, one or more of the challenges presented earlier may be addressed by utilizing an oxidizable additive or a precursor thereof as follows. In a first embodiment of the present invention, the formulation includes a discrete, oligomeric, or polymeric component that is selected from an oxidizable additive and a precursor to the oxidizable additive, wherein said precursor is capable of being converted into the oxidizable additive during processing or application of the formulation. The oxidizable additive comprises an organic or organometallic component including a first carbon atom, denoted as C1, attached to a hydrogen atom and surrounded by three moieties R1, R2, and R3. In some embodiments, two or more of the moieties R1, R2, and R3 function synergistically to lead to oxygen scavenging activity at the C1—H site. Particularly, C1—H bond becomes weaker than without one, two, or three of those moieties. This is not to say a molecule with only one of such groups would necessary fail to function. However, in many examples, higher activities are reached due to the synergistic effect. For a first example, the first carbon atom C1 is directly bonded to at least one of R1, R2, and R3. For a second example, the first carbon atom C1 is directly bonded to R1, R2, and R3. In a third example, at least one of R1, R2, and R3 is covalently directly bonded to at least another one of R1, R2, and R3. In a fourth example, at least one of R1 and R3 are bonded covalently to C1, and the at least one is also directly bonded to R2. In a fifth example, R1, R2, and R3 are not bonded to one another.

In a first aspect of the first embodiment, R1 includes a conjugated group directly attached to C1 with an atom selected from (1) an atom of $sp^2$ hybridization pattern, and (2) an atom of sp hybridization pattern; R2 includes a mesomeric group selected from a mesomeric electron donating group, a mesomeric electron-withdrawing group, and another conjugated group; and R3 is selected from a hydrogen (H), an organic residue and an organometallic residue.

The following description details options for R1 and options for R2 independent of each other's selection. Each such R1 option may be combined with each such R2 option unless stated otherwise or chemically impossible, such as when valence cannot be satisfied, or when the combination leads to unstable compound. In a first sub-aspect of the first aspect of the first embodiment with respect to the substituent R1, R1 includes a benzene ring directly attached to C1. For example, R1 is selected from a phenyl, a naphthyl, a phenanthrenyl, an anthracenyl, a quinolinyl attached to C1 at one of the four atoms belonging to the benzene portion of the fragment, and the like. In a second sub-aspect with respect to the substituent R1, R1 does not include a benzene ring directly attached to C1. The non-benzene conjugated group may be, for example, an alkenyl, an alkynyl, and the like. These substituents have smaller volumes, therefore asserts a smaller steric effect. Alternatively, the non-benzene conjugated group may be, for example, a pyridyl, a pyrrolyl, a thiophenyl, a furanyl, a quinolinyl attached to C1 at one of the four atoms belonging to the heteroatom ring portion of the fragment, and the like. These substituents have larger volumes, therefore asserts a greater steric effect. In a third sub-aspect with respect to the substituent R1, R1 may include a —X=Y double bond, wherein X is directly connected to C1 and selected from N, P, $CR^a$, N(=O), and P(=O), and Y is independently selected from an O, S, $NR^a$, N(=O)$R^a$, $PR^a$, P(=O)$R^a$, and $CR^bR^c$, wherein $R^a$, $R^b$, $R^c$ is each independently selected from H, an organic residue and an organometallic residue. For example, R1 includes a C=C double bond (such as a vinyl group and derivatives thereof) directly connected to C1. For another example, R1 does not include a C=C double bond directly connected to C1, and R1 includes, for instance, where R1 includes an imido (—N=$CR^bR^c$) group, wherein $R^b$ and $R^c$ is each independently selected from H, an organic residue and an organometallic residue. For another instance, R1 includes an imido ($NR^a$=$CR^b$—) group, wherein $R^a$ and $R^b$ is each independently selected from H, an organic residue and an organometallic residue. In a fourth sub-aspect with respect to the substituent R1, R1 is a conjugated group having electron-donating effect. For example, R1 is a phenyl group not attached to an electron-withdrawing group. In a fifth sub-aspect with respect to the substituent R1, R1 is a conjugated group having electron-withdrawing effect. For example, R1 is a cyano —CN group. In a sixth sub-aspect with respect to the substituent R1, R1 includes an extended conjugated group including two or more substituents described above and bonded together at an atom of either $sp^2$ or sp hybridized patterns. For example, R1 is a benzoyl group (Ph-C(=$O^a$)—$O^b$—) attached to C1 with $O^b$. In a seventh sub-aspect with respect to the substituent R1, R1 includes a substituent with a substituent effect opposite that of the mesomeric electron donating group or a mesomeric electron-withdrawing group of R2. Additionally to sterics, the selection of proper groups may also take into account the flexibility of the fragment and the availability for access to the C1 site. These same considerations for selecting R1 are also at play for R2, R3 in this embodiment and subsequent embodiments.

With respect to R2, several sub-aspects are available as well, each independent from the selection of R1. In a first sub-aspect with respect to R2, R2 is a second conjugated group. All available options for R1 are also available for R2. For example, R2 includes a benzene ring directly attached to C1. For another example, R2 does not include a benzene ring directly attached to C1. For a further example, R2 includes a C=C double bond directly attached to C1. For yet another example, R2 does not include a C=C double bond directly attached to C1. For yet a further example, R2 includes imido (—N=$CR^bR^c$) group, or imido ($NR^a$=$CR^b$—) group, wherein $R^a$, $R^b$ and $R^c$ are each independently selected from H, an organic residue and an organometallic residue.

In a second sub-aspect of the first aspect with respect to R2, R2 includes a mesomeric electron donating group. For example, R2 includes one of a thiolate anion (—S$^-$) group, an oxide anion (—O$^-$) group, an amine (—$NR^2$, —NHR, —$NH_2$) group, an ether (—OR) group, and a hydroxy (—OH) group, amide (—NHCOR) group, an ester (—OCOR) group, a sulfonamide (—NHS(=O)$_2$R) group, a styryl (—CH=CH—C$_6$H$_5$) group, a ferrocenyl group, a triphenylphosphine imide (—N=P(C$_6$H$_5$)$_3$) group, a thiol (—SH) group, a phosphonic dichloride (—P(=O)Cl$_2$) group, an isocyanate (—N=C=O) group, an alkyl groups, a methylenedioxy (—OCH$_2$—) group, a vinyl (—CH=CH$_2$) group, a trialkyltin (—Sn(CH$_3$)$_3$) group, a furyl group, a thienyl goup, a tetramethylsilane (—CH$_2$—Si(CH$_3$)$_3$) group, and so on. All these groups may be further substituted to enhance the electron-donating ability.

In a third sub-aspect with respect to R2, R2 includes a mesomeric electron withdrawing group. For example, R2 includes a cyano (CN) group, a triflyl (—SO$_2$CF$_3$) group, a trihalide group (—CF$_3$, —CCl$_3$), a sulfonate (—SO$_3$H) group, a nitro (—NO$_2$) group, a nitrosyl (—NO) group, an aldehyde (—CHO) group, a ketone (—COR) group, a carboxylic acid (—COOH or —COO$^-$) group, an acyl chloride (—COCl) group, an esters (—COOR) group, and an amide (—CONH$_2$) group, a nitrogen cation (—N$^+$≡N) group, an arsenic acid (As(O)(OH)$_2$ or AsO$_3$H$^-$) group, a sulfonamide (—S(=O)$_2$NHR, (—S(=O)$_2$NR$_2$) group, a trifluoromethyl (—CF$_3$) group, methylsulfinate (—SO$_2$(CH$_3$)) group, methylsulfenate (—SOCH$_3$) group, thiocyanate (—SCN) group, alkyne (—C≡CH) group, vinyl with strong electron-withdrawing groups (e.g. —CH=CH—NO$_2$), a dialkyl phosphoryl (—P(=O)R$_2$) group, a dialkyl thiophosphoryl (—P(=S)R$_2$) group, a dialkylphosphine (—PR$_2$) group, a tetramethylphosphonium (—P(CH$_3$)$_4$$^+$) group, pyridyl groups, a benzoxazole group, a benzothiazolyl group, a conjugated group or hyperpolarizable atom directly bonded to perfluorinated alkyl groups. All these groups may be further substituted to enhance the electron-withdrawing ability. For example, fluoromethylsulfinate (—SO$_2$(CF$_3$), —SO$_2$(CHF$_2$)) group, fluoromethylsulfenate (—SOCF$_3$, —SOCHF$_2$) group.

In a fourth sub-aspect with respect to R2, R2 directly bonds to C1. For example, R2 includes carbonyl wherein the carbonyl carbon directly bonds to C1 covalently. In a fifth sub-aspect, R2 is spatially proximal to the C1 although not covalently attached. For example, R2 includes a polybutylene glycol oligomer or polymer fragment, wherein one of the glycol oxygen atoms is spatially proximal to and in electronic communication with C1. In a sixth sub-aspect, R2 is spatially proximal to and in electronic communication with the hydrogen atom attached to C1 although not covalently attached. For example, R2 includes a polyamine oligomer or polymer fragment, wherein one of the amine nitrogen atom is spatially proximal to the hydrogen atom attached to C1 and asserts an electron-withdrawing effect.

In a seventh sub-aspect with respect to R2, R2 includes a mesomeric substituent of a formula Q(CZ$_1$Z$_2$-Ar$_1$)(CZ$_3$Z$_4$-Ar$_2$), wherein the Ar$_1$ and Ar2 are each independently selected from an aryl and a heteroaryl which is each independently substituted with 0, 1, 2, or 3 groups independently selected from halogen, C1-C4 alkyl, and electron withdrawing groups and valence is satisfied, Z$_1$-Z$_4$ each independently selected from hydrogen, halogen, C1-C4 alkyl, electronic withdrawing group, electronic donating group, or collectively =O; provided that at least one of the Z$_1$, Z$_2$ set and Z$_3$, Z$_4$ set are hydrogens; Q is selected from N and P and directly bonds to C1, and R1 includes an aryl or a heteroaryl.

In an eighth sub-aspect with respect to R2, R2 includes a mesomeric substituent is of a formula other than those described in the seventh sub-aspect. For example, R2 includes the same formula as described above for the seventh sub-aspect with the exception that Q is selected from P=O and N=O with either the phosphorous P atom, or the nitrogen N atom attached directly to C1. For another example, R2 includes the same formula as described above for the seventh sub-aspect with the exception that at least one of Ar$_1$ and Ar$_2$ is replaced with a —X=Y double bond, wherein X directly connects to carbon atom which in turn directly bonded to Q and is selected from N, P, and CR$^a$, and Y is independently selected from an O, S, NR$^a$, PR$^a$, and CR$^b$R$^c$, wherein R$^a$, R$^b$, R$^c$ is each independently selected from H, an organic residue and an organometallic residue. For yet another example, R2 includes the same formula as described above for the seventh sub-aspect with the exception that both of A$_1$ and Ar$_2$ are each replaced with a —X=Y double bond, wherein the —X=Y group is independently defined as follows: X directly connects to carbon atom which in turn directly bonded to Q and is selected from N, P, and CR$^a$, and Y is independently selected from an O, S, NR$^a$, PR$^a$, and CR$^b$R$^c$, wherein R$^a$, R$^b$, R$^c$ is each independently selected from H, an organic residue and an organometallic residue. For a further example, R2 includes the same formula as described above, and R1 is other than an aryl or a heteroaryl group.

For each of the above sub-aspects with respect to either R1 or R2, R1 and R2 may be covalently bonded together to form a ring. Alternative, R1 or R2 may be covalently bonded to R3 to form a ring. For example, both R1 and R2 are phenyl groups directly attached to C1, wherein R1 and R2 are also covalently bonded at the position ortho- to C1 for both phenyls. In other words, R1, R2, and C1 collectively form a flurorene fragment. For another example, R1 is a phenyl group, R2 is an amide group attached to C1 with the nitrogen atom, wherein the carbonyl of R2 is directly bonded to R1 to form a five-member ring. In other words, R1, R2, and C1 collectively form a dihydrophthalimide fragment. In various situations, it may be preferable to include ring as it helps reduce the production of small migrants from oxidations, and help increase the reactivity to oxidation reaction. In some embodiments, C1, R1, and R2 collectively determine the reactivity.

Representative examples of the present embodiment may be understood in reference to the following examples of specific R1, R2, and R3. For a first example, R1 includes a phenyl attached directly to C1, R2 includes a phenyl attached directly to C1, and R3 is hydrogen (BDE=84.7). For a second example, R1 includes a phenyl attached directly to C1, R2 includes a C=C double bond directly attached to C1, and R3 is an ethyl group. For a third example, R1 includes a phenyl attached directly to C1, R2 includes a C≡C triple bond attached directly to C1, and R3 is a hydrogen (BDE=80.0). For a fourth example, R1 includes a C=C double bond attached directly to C1, R2 includes a C≡C triple bond attached directly to C1, and R3 is a carboxylic group (—COOH). In a fifth example, R1 includes a C=C double bond directly attached to C1 on a first double bond carbon atom C2, C2 attached to the carbonyl carbon atom of a carboxylic acid or ester group, R2 includes a carboxylic acid or ester group with its carbonyl carbon attached to C1, and R3 is hydrogen (BDE=87.8). In a sixth example, R1 includes a benzene ring directly attached to C1, R2 includes a carboxylic acid or ester group with the carbonyl carbon attached to C1, and R3 is a hydrogen (BDE=84.9). In a seventh example, R1 includes a benzene ring directly attached to C1, R2 includes a carboxylic acid or ester group with the carbonyl carbon attached to C1, and R3 includes a hydroxyl or alkoxy group (BDE=75.5). In an eighth example, R1 includes a benzene ring directly attached to C1, R2 includes a carboxylic acid or ester group with the carbonyl carbon attached to C1, and R3 includes an ester with the non-carbonyl oxygen atom attached to C1 (BDE=79.1, 86.1). In a ninth example, R1 includes a benzene ring directly attached to C1, R2 includes an amide group with the carbonyl carbon attached to C1, and R3 includes an alkyl group such as n-butyl group. In a tenth example, R1 includes a benzene ring directly attached to C1, R2 includes a carboxylic acid group or an amide group with the carbonyl carbon attached to C1, and R3 includes an amine group directly attached to C1 with the amine nitrogen atom (BDE<85.7). In an eleventh example, R1 includes a benzene ring directly attached to C1, R2 includes a carboxylic acid group or an amide group with the carbonyl carbon attached to C1, and R3 includes a hydroxy or alkoxy group directly attached to C1 with the oxygen atom (BDE<85.7).

For a twelfth example, R1 includes a C=N double bond with its carbon end attached to C1, R2 includes a phenyl ring attached directly to C1, and R3 is hydrogen. For a thirteenth example, R1 includes a C=C double bond directly attached to C1, R2 includes a C=N double bond with its nitrogen end attached to C1, R3 is a methyl group (BDE=59.8). For a fourteenth example, R1 includes a phenyl ring attached directly to C1, R2 includes a C=N double bond with its N end directly attached to C1, and R3 is hydrogen (BDE~76.0). For a fifteenth example, R1 includes a phenyl ring attached directly to C1, R2 includes a C=N double bond with its N end directly attached to C1, and the carbon end of the C=N double bond is directly bonded to a conjugated group, and R3 is a hydrogen (BDE~76.0). For a sixteenth example, R1 includes a phenyl ring attached directly to C1, R2 includes a C=N double bond with its N end directly attached to C1, and the carbon end of the C=N double bond is directly bonded to two benzene rings, and R3 is a hydrogen. It has been found that C1 when attached to the N end of the C=N double bond, the oxidizable additive has specially high reactivity. Therefore, oxidizable additives having this functional group may be particularly useful for, for example, low temperature packaging (e.g. refrigerated temperature), packaging requiring rapid removal of oxygen inside the packaging container, packaging requiring zero or near zero amount of residual level (or ingression) of oxygen. Conversely, oxidizable additives having this functional group may require special handling during the processing of the composition to ensure the effectiveness is not substantially affected by the processing. For example, a liquid carrier may be necessary. For a seventeenth example, R1 includes a naphthalene ring, R2 includes an ester group attached to C1 with the carbonyl carbon atom, and R3 is a hydrogen (BDE=84.9). For an eighteenth example, R1 includes an anthraquinone attached to C1 with one of its peripheral carbon atoms, and R2 includes an ester group attached to C1 with the non-carbonyl oxygen atom, R3 is hydrogen (BDE<86.5). For a nineteenth example, R1 includes a carbonyl group with the carbonyl carbon atom attached directly to C1, and R2 includes a C≡C triple bond. For a twentieth example, R1 includes a C=C double bond directly attached to C1, R2 includes a carboxylic acid or ester group with its carbonyl carbon attached to C1, and R3 is a hydrogen. For a twenty-first example, R1 includes a benzene ring directly attached to C1, R2 includes cyano group directly attached to C1, and R3 includes a methyl group (BDE<82.0). For a twenty-second example, R1 includes a C=C double bond directly attached to C1, R2 includes a nitrogen atom directly connected to C1 and also directly to two allylic carbon (BDE~84.7). For a twenty-third example, R1 includes a C≡C triple bond directly attached to C1, R2 includes a phosphorous atom directly connected to C1 and also directly to an allylic carbon, and R3 is a hydrogen. For a twenty-fourth example, R1 includes a phenyl directly connected to C1, R2 includes N(=O) directly connected to C1 with its nitrogen atom, wherein the nitrogen atom also directly connects to two benzyl carbon atoms, and R3 is a hydrogen. In a twenty-fifth example, R1 includes a naphthalene directly connected to C1, R2 includes P(=O) directly connected to C1 with its phosphorous atom, wherein the phosphorous atom also directly connects to two benzyl carbon atoms, and R3 is a hydrogen. For a twenty-sixth example, R1 and R2 both includes —CN directly connected to C1, and R3 is a methyl group.

In a second aspect of the first embodiment, R1 includes a —X(=Y)-$A^H$-group, wherein $A^H$ is a heteroatom having a free lone pair and directly attached to C1, X selected from an N, P, and $CR^a$, and Y selected from selected from an O, S, $NR^a$, $PR^a$, and $CR^bR^c$, independent of the identity of X, wherein $R^a$, $R^b$, $R^c$ is each independently selected from H, an organic residue and an organometallic residue; R2 includes a mesomeric group directly connected to C1 via an atom of sp² hybridization, sp hybridization or with a free lone pair directed connected to or in close proximity to and in electronic communication with C1 or a hydrogen atom attached to C1; and R3 is selected from a hydrogen (H), an organic residue and an organometallic residue.

The following description details options for R1 and options for R2 independent of each other's selection. Each such R1 option may be combined with each such R2 option unless stated otherwise or chemically impossible, such as when valence cannot be satisfied, or when the combination leads to unstable compound.

In a first sub-aspect of the second aspect with respect to R1, R1 includes a carboxylate group connected to C1 via the non-carbonyl oxygen. In a second sub-aspect of the second aspect with respect to R1, R1 includes an amide group connected to C1 via the nitrogen atom. In a third sub-aspect of the second aspect with respect to R1, R1 includes a sulfonamide, a sulfinamide or a sulfenamide group connected to C1 via the nitrogen atom. In a fourth sub-aspect of the second aspect with respect to R1, R1 includes a sulfonate, a sulfinate or a sulfenate group connected to C1 via one of the oxygen atoms. In a fifth sub-aspect of the second aspect with respect to R1, R1 includes a phosphate, a phosphonate, or a phosphinate, connected to C1 via one of the oxygen atoms. In a sixth sub-aspect of the second aspect with respect to R1, R1 includes a phosphamide, a phosphoramide, or a phosphiramide group connected to C1 via the nitrogen atom.

In a first sub-aspect of the second aspect with respect to R2, R2 includes a conjugated group. For example, R2 includes any of the conjugated groups described above in the first aspect. For a first example, R2 includes a benzene ring directly attached to C1 when R1 includes an amide group directly attached to C1 via the nitrogen atom. For a second example, R2 includes a conjugated group other than a benzene ring directly attached to C1 when R1 includes an amide group directly attached to C1 via the nitrogen atom. For a third example, R2 includes a benzene group when R1 does not include an amide group directly attached to C1 via the nitrogen atom.

In a second sub-aspect of the second aspect with respect to R2, R2 includes an atom A2 in proximity to and electronic communication with the C1, the atom selected from an oxygen, a sulfur, a phosphorous, and a nitrogen. For a first example, R2 includes a polyether fragment or a polyalkyleneglycol fragment having a carbon chain of 2 to 10 carbon atoms, wherein A2 is oxygen, not directly connected to but in proximity to and electronic communication with C1. For a second example, R2 includes a tetrahydrofurfuryl group attached directly to C1 with a carbon atom next to the tetrahydrofurfuryl oxygen. For other examples, R2 is other than those described in the first two examples. For a third example, R2 includes a polyether fragment or a polyalkyleneglycol fragment having a carbon chain of 11 or more carbon atoms wherein the fragment has an oxygen atom (A2) within a direct point-to-point distance of approximately four C—O single bond distance away from C1. For a fourth example, R2 includes one or more oxygen atoms wherein at least one oxygen atom (A2) is within a direct point-to-point distance of three typical C—O single bond distances from C1. For a fifth example, R2 includes a polybutylene glycol fragment with at least one oxygen atom (A2) within a direct point-to-point distance of three typical C—O single bond distances from C1. For other examples, R2 includes other heteroatoms. For a sixth example, R2 includes a polyamine fragment with a nitrogen atom (A2) within a direct point-to-point distance of three typical C—N single bond distances from C1. For a seventh example, R2 includes a polyamine fragment with a nitrogen atom (A2) within a direct point-to-point distance of three typical H—N single bond distances from the closer hydrogen atom attached to C1. For an eighth example, R2 includes a etheramine (e.g. polyetheramine) fragment with a heteroatom (A2) within a direct distance of three typical H-A2 single bond distances from the closer hydrogen atom attached to C1.

Representative examples of the present aspect may be understood in reference to the following examples of specific R1, R2, and R3. For a first example, R1 is a benzoate connected to C1 via the non-carbonyl oxygen atom; R2 is a polyether fragment or a polyalkyleneglycol fragment having a carbon chain of 11 carbon atoms wherein the fragment has an oxygen atom (A2) within a direct point-to-point distance of approximately four C—O single bond distance away from C1; and R3 is hydrogen. BDE=For a second example, R1 is a benzamide connected to C1 via the nitrogen atom; R2 is a polyamine fragment having a nitrogen atom within a direct point-to-point distance of approximately three typical N—H single bond distance from a hydrogen atom attached to C1; and R3 is hydrogen. For a third example, R1 is an adipamide connected to C1 via one of its nitrogen atoms, R2 is a tetrahydrofurfuryl group attached directly to C1 via a carbon atom next to the tetrahydrofurfuryl oxygen; and R3 is a methyl group.

In a third aspect of the first embodiment, R1 includes a conjugated system with connected carbons each with a sp2 hybridization pattern, R2 and R3 each independently selected from a hydrogen, an organic residue and an organometallic residue, wherein the conjugated system is substituted with R4.

The following description details options for R1 and options for R4 independent of each other's selection. Each such R1 option may be combined with each such R4 option unless stated otherwise or chemically impossible, such as when valence cannot be satisfied, or when the combination leads to unstable compound.

In a first sub-aspect of the third aspect, the substituent R4 extends the conjugation of the conjugated system of R1. When the substituent is of an electron-withdrawing nature, R4 is preferably attached to the ortho- or para-position of an aromatic ring relative to C1, or an even number of bonds away from C1 for better extension of conjugation. Alternatively, electron-withdrawing R4 may be attached to a position with an odd number of bonds away from C1 for linear 1,3-butadiene type conjugation systems. For a first example, R1 includes a conjugation system of a C=C double bond directly connected to C1 and the substitution R4 is a second C=C double bond such that the conjugated system is extended onto the substitution. For a second example, R1 includes a conjugated system of a benzene ring directly connected to C1, and the substitution R4 includes a 1,3-butadiene which bonds to two neighboring members of the benzene ring with its two end carbons, thereby forming a naphthalene ring. There may be additional substitutions on the extended conjugation system. For a third example, R1 includes a conjugated system of a benzene ring directly connected to C1 and R4 includes a C=C double bond such that the conjugated system is extended onto the substitution. For a fourth example, R1 includes a conjugated system of a benzene ring and R4 includes a group selected from —CN and —NO on para- or ortho-position of a benzene ring relative to C1, such that the conjugated system is extended onto the substitution.

In a second sub-aspect of the third aspect, R1 includes a conjugated system of an aromatic ring and the substituent R4 is selected from (1) an inductive electron-donating group directly attached to the aromatic ring, (2) a mesomeric electron-donating group directly attached to a meta-position of the aromatic ring relative to the C1, (3) a mesomeric electron-donating group directly attached to a para- or ortho-position of the aromatic ring relative to the C1, and (4) an inductive electron-donating group in proximity and electronic communication with C1 or an hydrogen atom attached to C1, but not directly bonded to the aromatic ring.

Representative examples of the present aspect may be understood in reference to the following examples. For a first example, the aromatic ring is a benzene ring attached directly to C1, and R1 includes an inductive electron-donating group of a $B(OH)_3$— group attached to the benzene ring. The inductive electron-donating group does not have a substantial mesomeric EDG effect. For a second example, the aromatic ring is a benzene ring attached directly to C1, and R1 includes an inductive electron-donating group of a —C(=O)O⁻ group attached to the meta-position of the benzene ring relative to C1. For a third example, the aromatic ring is a benzene ring attached directly to C1, and R1 includes a mesomeric electron-donating group of an amine group attached to the meta-position of the benzene ring relative to C1. For a fourth example, the aromatic ring is a benzene ring attached directly to C1, and R1 includes a mesomeric electron-donating group of alkoxide group attached to the para- or ortho-position of the benzene ring relative to C1. For a fifth example, R1 includes an electron-donating group attached to both the meso- and para-positions of the aromatic ring relative to the C1 to form a ring. For a sixth example, R1 includes an electron-donating group attached to both the meso- and para-positions of the aromatic ring relative to the C1 to form a ring, wherein the electron-donating group is a predominantly inductive electron-donating group. For a first instance, the electron-donating group attaches to the aromatic ring with two carbon atoms. For a second instance, the electron-donating group is selected from —$(CH_2)_3$—, —$(CH_2)_4$—, —$(CH_2)_5$—, —$(CH_2)_6$— and derivatives thereof and attaches to the aromatic ring with two carbon atoms. For a third instance, the electron-donating group is a heteroatom derivative of one of —$(CH_2)_3$—, $(CH_2)_4$—, —$(CH_2)_5$—, and —$(CH_2)_6$—, and attaches to the aromatic ring with a heteroatom. For an eighth example, R1 includes an electron-donating group attached to both the meso- and ortho-positions of the aromatic ring relative to the C1 to form a ring. In a ninth example, the electron-donating group attaches to both the meso- and ortho-positions of the aromatic ring relative to the C1 to form a ring, wherein the electron-donating group is a predominantly inductive electron-donating group. For a first instance, the electron-donating group attaches to the aromatic ring with two carbon atoms. For a second instance, the electron-donating group is selected from —$(CH_2)_3$—, —$(CH_2)_4$—, —$(CH_2)_5$—, —$(CH_2)_6$— and derivatives thereof and attaches to the aromatic ring with two carbon atoms. For a third instance, the electron-donating group is a heteroatom derivative of one of —$(CH_2)_3$—, —$(CH_2)_4$—, —$(CH_2)_5$—, and —$(CH_2)_6$—, and attaches to the aromatic ring with a heteroatom.

In a fourth aspect of the first embodiment, R1 is an electron donating group, R2 is an electron withdrawing group, and R3 is selected from a hydrogen, an organic residue and an organometallic residue. It is preferable, although not necessary, that R1, R2, and R3 do not assert a strong inductive electron-withdrawing effect. The following description details options for R1 and options for R2 independent of each other's selection. Each such R1 option may be combined with each such R2 option unless stated otherwise or chemically impossible, such as when valence cannot be satisfied, or the combination leads to unstable compound.

In a first sub-aspect, R1 is a strong mesomeric electron-donating group, R2 is a strong mesomeric electron-withdrawing group, and R3 is selected from a hydrogen, an organic residue and an organometallic residue. For example, R1 is selected from a phenoxide (—$O^-$) group, an amine (—$NR_2$, —NHR, —$NH_2$) group, an ether (—OR) group, and a hydroxy (—OH) group; R2 is selected from a cyano (CN) group, a triflyl (—$SO_2CF_3$) group, a sulfonate (—$SO_3H$) group, a nitro (—$NO_2$) group.

In a second sub-aspect, at least one of R1 and R2 is not a strong-effect mesomeric electron-donating group, and R3 includes a conjugated group attached to C1 via an atom of a hybridization pattern selected from sp2 and sp. For example, R1 is a predominantly inductive electron-donating group, R2 is a predominantly inductive electron-withdrawing group, or one of R1 and R2 is a weak to moderate effect group. More specifically, for a first example, R1 is selected from $B(OH)_3$—, $(CH_2)_3$—, $(CH_2)_4$—, $(CH_2)_5$— and derivatives thereof, R2 is a carboxylate (—$COOR_4$) group attached to C1 with the carbonyl carbon, and R3 is a benzene or C=C double bond directly attached to C1. For a second example, R1 is selected from thiolate anion (—$S^-$) group, an oxide anion (—$O^-$) group, an amine (—$NR_2$, —NHR, —$NH_2$) group, an ether (—OR) group, and a hydroxy (—OH) group, amide (—NHCOR) group, an ester (—OCOR) group, a sulfonamide (—NHS(=O)$_2$R) group, a styryl (—CH=CH—$C_6H_5$) group, a ferrocenyl group, a triphenylphosphine imide (—N=P($C_6H_5$)$_3$) group, a thiol (—SH) group, a phosphonic dichloride (—P(=O)$Cl_2$) group, an isocyanate (—N=C=O) group, an alkyl groups, a methylenedioxy (—$OCH_2$—) group, a vinyl (—CH=$CH_2$) group, a trialkyltin (—Sn($CH_3$)$_3$) group, a furyl group, a thienyl goup, a tetramethylsilane (—$CH_2$—Si($CH_3$)$_3$) group, and derivatives thereof; R2 is selected from a cyano (CN) group, a triflyl (—$SO_2CF_3$) group, a trihalide group (—$CF_3$, —$CCl_3$), a sulfonate (—$SO_3H$) group, a nitro (—$NO_2$) group, a nitrosyl (—NO) group, an aldehyde (—CHO) group, a ketone (—COR) group, a carboxylic acid (—COOH or —$COO^-$) group, an acyl chloride (—COCl) group, an esters (—COOR) group, and an amide (—$CONH_2$) group, a nitrogen cation (—$N^+\equiv N$) group, an arsenic acid (As(O)(OH)$_2$ or $AsO_3H^-$) group, a sulfonamide (—S(=O)$_2$NHR, —S(=O)$_2NR_2$) group, a trifluoromethyl (—$CF_3$) group, methylsulfinate (—$SO_2$($CH_3$)) group, methylsulfenate (—$SOCH_3$) group, thiocyanate (—SCN) group, alkyne (—C≡CH) group, vinyl with strong electron-withdrawing groups (e.g. —CH=CH—$NO_2$), a dialkyl phosphoryl (—P(=O)$R_2$) group, a dialkyl thiophosphoryl (—P(=S)$R_2$) group, a dialkylphosphine (—$PR_2$) group, a tetramethylphosphonium (—P($CH_3$)$_4^+$) group, pyridyl groups, a benzoxazole group, a benzothiazolyl group, a conjugated group or hyperpolarizable atom directly bonded to perfluorinated alkyl groups, and derivatives thereof; and R3 is selected from an aromatic group, an alkenyl group, and a alkynyl group.

Representative examples of the present aspect may be understood in reference to the following examples of specific R1, R2, and R3. For a first example, R1 includes a —$NH_2$ attached directly to C1, R2 includes a —CN attached directly to C1, and R3 is a hydrogen. For a second example, R1 includes a fragment selected from an ether, a hydroxy, a thiol, a thioether, and an amine fragment, each with the heteroatom directly attached to C1, and R2 includes a carbonyl directly attached to C1. For instance, R1 includes a thiolate group (PhS— or PrS—) directly attached to C1, R2 includes one of —C(O)-Ph, —C(O)—N-Ph, —C(O)—O-Ph, and R3 is hydrogen, wherein Ph represents phenyl group, and Pr represents a propyl group. For a third example, R1 includes a —OH attached directly to C1, R2 includes a —COOH attached directly to C1, and R3 includes a C=C attached directly to C1. For a fourth example, R1 includes a fragment selected from a hydroxy group, an alkoxide group with the oxygen atom attached to C1, an amine group with the nitrogen atom attached to C1, R2 includes a fragment selected from a carboxylic acid group, an ester group each with the single bonded oxygen attached directly to C1 and an amide group with the single bonded nitrogen attached directly to C1, and R3 includes a benzene ring directly attached to C1. For a fifth example, R1 includes a C=C double bond directly attached to C1, R2 includes an electron-withdrawing group, such as ammonium ions —N($CH_3$)$_3^+$, —$NH_3^+$, and R3 is a hydrogen. For a sixth example, R1 includes an imido —N=C($CH_3$)(OH), and R3 includes a —C=$CH_2$ group. For a seventh example, R1 is a ($Ar_2$—$CZ_1Z_2$)($Ar_1$—$CZ_3Z_4$)Q fragment wherein the $Ar_1$ and $Ar_2$ are each independently selected from an aryl and a heteroaryl which is each independently substituted with 0, 1, 2, or 3 groups independently selected from halogen, C1-C4 alkyl, and electron withdrawing groups and valence is satisfied, $Z_1$-$Z_4$ each independently selected from hydrogen, halogen, C1-C4 alkyl, electronic withdrawing group, electronic donating group, or collectively =O; provided that at least one set of $Z^1$ and $Z^2$ are hydrogens; and Q is selected from N and P and directly bonds to C1; and R2 is a substituted phenyl group. For an eighth example, the R1 and R2 combination is other than the combination of the seventh example. For a first instance, R1 includes (Al—$CZ_1Z_2$)(Al—$CZ_3Z_4$)Q, wherein Al represents a substituted or unsubstituted allyl group, $Z_1$-$Z_4$ are independently selected from hydrogen, an organic residue and an organometallic residue provided that at least one of $Z_1$-$Z_4$ is a hydrogen atom, and Q is selected from N and P; and R2 includes an allyl group. For a second instance, R1 includes ($Ar_2$—$CZ_1Z_2$)($Ar_1$—$CZ_3Z_4$)Q fragment wherein the $Ar_1$, $Ar_2$, $Z_1$-$Z_4$ are according to as described above for the seventh example, and Q is selected from a nitrosyl (—N=O) and a phosphoryl (—P=O) and directly bonds to C1; and R2 is a conjugated group.

In a fifth aspect of the first embodiment, the structure as described in any one of the above aspects, wherein the structure further includes a ring. In various situations, the structures including a ring may be preferable due to various reasons. For example, if the oxidization reaction involves cleavage of a single bond which is part of a ring, no migratable product will be produced and cause complications with respect to health or safety. For another example, the C1 atom is part of a rigid ring, wherein bonds involving C1 are not freely rotatable. The rigidity of a ring minimizes the change of steric strain energy during the oxidation reaction which is beneficial towards increasing the reactivity towards oxygen.

In a sixth aspect of the first embodiment, the structure as described in any one of the above aspects, wherein the structure is a polymeric.

In a seventh aspect of the first embodiment, the structure as described in any one of the above aspects, wherein the structure is a dendrimeric.

In an eighth aspect of the first embodiment, the structure as described in any one of the above aspects, wherein the structure is a host-guest complex.

In a ninth aspect of the first embodiment, the oxidizable additive further includes multiple coordinative sites and further includes a metal ion interacting with at least one of the multiple coordinative sites. In a first sub-aspect, the metal ion is redox-inert. In a second sub-aspect, the metal ion is redox-active. In a third sub-aspect, the metal ion also serves as the oxidation catalyst.

In a tenth aspect of the first embodiment, the formulation further includes a catalyst. The catalyst is described further in a later section.

In an eleventh aspect of the first embodiment, the oxidizable additive has an OI higher than approximately 100. In the tenth aspect of the invention, the oxidizable additive has an OOI higher than approximately 100.

In a twelfth aspect of the first embodiment, the oxidizable additive further includes a C—H bond having a homolytic BDE satisfying a threshold as described in the third embodiment later.

In a second embodiment of the present invention, the formulation includes a discrete, oligomeric, or polymeric molecule that is selected from an oxidizable additive and a precursor to the oxidizable additive, wherein said precursor is capable of being converted into the oxidizable additive during processing or application of the formulation.

The oxidizable additive comprises a first organic or organometallic fragment selected from a first group consisted of formulae (I), (II), (III), (IV), and (V):

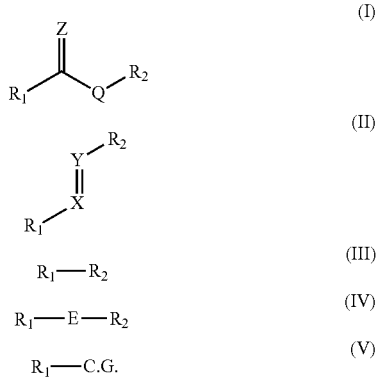

wherein at least one of $R_1$ and $R_2$ includes a fragment selected from the group consisted of formulae (A)-(D):

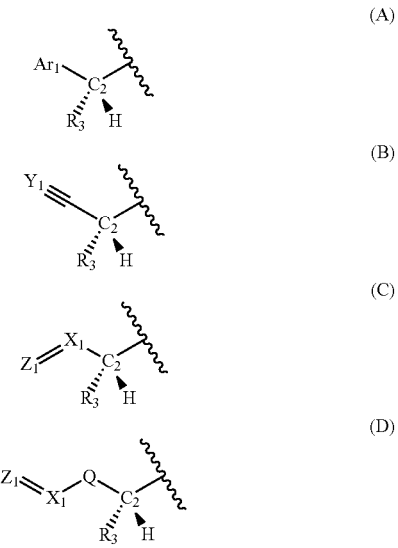

wherein $Ar_1$ may be any organic or organometallic aromatic substituent; R3 may be selected from hydrogen (H), an organic residue, and an organometallic residue; X, Y, $X_1$, and $Y_1$ may each be independently selected from the group consisted of $CR_0$, $SiR_0$, N, P; Z, Q, $Z_1$, are each independently selected from the group consisted of O, S, $NR_0$, $PR_0$, wherein $R_0$ is selected from H, or any organic or organometallic residue; and C.G. represents a conjugated group as described above in the first embodiment.

In a first aspect of the second embodiment, the structure includes formula (I), $R_1$ includes formula (A), and $R_2$ and $R_3$ are each independently selected from a hydrogen, an organic residue and an organometallic residue. In a first sub-aspect, $R_2$ is selected from benzene and naphthalene and $R_2$ has two identical substituents, Q is —NH— and Z is O. In a second sub-aspect, the combination of $R_2$, Q, and Z are other than that described for the first sub-aspect. For a first example, $Ar_1$ is selected from an organic and an organometallic aromatic substituent; Z and Q are each independently selected from the group consisted of O, $NR_0$, S, $PR_0$, wherein $R_0$, $R_2$ and $R_3$ are each independently selected from H, an organic residue, and an organometallic residue. For a first instance, Z and Q are both oxygen, $R_2$ is hydrogen, and $R_3$ is hydroxy group (—OH). For a second instance, Z and Q are both oxygen, $R_2$ is hydrogen, and $R_3$ is alkoxy group (—$OR_0$). For a third instance, Z and Q are both oxygen, $R_2$ is alkyl group, and $R_3$ is alkoxy group (—$OR_0$). For a fourth instance, Z is oxygen, Q is nitrogen, $R_2$ is an alkyl group, $R_3$ is hydrogen. For a second example, $R_2$ is selected from benzene and naphthalene, wherein $R_2$ has two identical substitutions; Q is —NH— and Z is oxygen (O). For a third example, $R_2$ is an aromatic ring other than benzene or naphthalene. For a fourth example, $R_2$ is selected from benzene or naphthalene, and $Ar_1$ is other than a benzene group.

In a second aspect of the second embodiment, the structure includes formula (I), $R_1$ is selected from the group consisted of formulae (B)-(D), and $R_2$ and $R_3$ are each independently selected from a hydrogen, an organic residue and an organometallic residue. For a first example, $R_1$ includes formula (C), wherein both $Z_1$ and $X_1$ are =$CH_2$, Z is oxygen (O), Q is —NH— and $R_2$ is hydrogen. For a second example, $R_1$ includes formula (C), wherein X is =$CR_0$— ($R_0$ is —COOH), $Z_1$ is —$CH_2$—, both Z and Q are oxygen (O), and $R_2$ is hydrogen. For a third example, $R_1$ includes formula (C), wherein X is =$CR_0$— ($R_0$ is —$COOR_4$), $Z_1$ is —$CH_2$—, both Z and Q are oxygen (O), and both $R_2$ and $R_4$ include alkyl groups.

In a third aspect of the second embodiment, the structure includes formula (I), $R_1$ and $R_3$ are each independently selected from H, an organic residue and an organometallic residue; $R_2$ includes formula (A), Z and Q are each independently selected from the group consisted of O, $NR_0$, S, $PR_0$, $CR_0R_4$, wherein $R_0$ and $R_4$ are each independently selected from H, an organic residue and an organometallic residue; wherein Q may include nitrogen directly connected to $C_2$ only either when Z is not oxygen, or when $Ar_1$ is selected from an organic aromatic group and an organometallic aromatic group which does not include a benzene directly connected to C2.

In a fourth aspect of the second embodiment, the structure includes formula (I), $R_1$ and $R_3$ are each independently selected from H, an organic residue and an organometallic residue; $R_2$ includes formula (C), Z and Q are each independently selected from the group consisted of O, $NR_0$, S, $PR_0$, $CR_0R_4$, wherein $R_0$ and $R_4$ are each independently selected from H, an organic residue and an organometallic residue; wherein Q may include nitrogen directly connected to C2 only either when either Z is not oxygen, or when $Z_1$=$X_1$ is not a C=C double bond.

In a fifth aspect of the second embodiment, the structure includes formula (I), $R_1$ and $R_3$ are each independently selected from H, an organic residue and an organometallic residue; R2 includes a formula (A), Z and Q are each independently selected from the group consisted of O, $NR_0$, S, $PR_0$, $CR_0R_4$, wherein $Ar_1$ is selected from an organic aromatic group and an organometallic aromatic group and does not include two identical substitutions, $R_0$ and $R_4$ are each independently selected from a hydrogen, an organic residue and an organometallic residue. For example, Q is —$NR_0$—, Z is oxygen.

In a sixth aspect of the second embodiment, the structure includes formula (I), $R_1$ and $R_3$ are each independently selected from H, an organic residue and an organometallic residue; $R_2$ includes a formula (C), Z, $Z_1$, and Q are each independently selected from the group consisted of O, $NR_0$, S, $PR_0$, $CR_0R_4$, $X_1$ is selected from the group consisted of $CR_0$, $SiR_0$, N, P, wherein $R_0$ and $R_4$ are each independently selected from H, an organic residue and an organometallic residue. For example, Q is —$NR_0$—, Z is oxygen.

In a seventh aspect of the second embodiment, the structure includes formula (I), $R_1$ and $R_3$ are each independently selected from H, an organic residue and an organometallic residue; $R_2$ includes formula (A), Z and Q are each independently selected from the group consisted of O, $NR_0$, S, $PR_0$, $CR_0R_4$; wherein $R_1$ does not include the group —C(=Z)-Q-$R_2$, and $R_0$ and $R_4$ are each independently selected from a hydrogen, an organic residue and an organometallic residue. For example, Q is —$NR_0$—, Z is oxygen.

In an eighth aspect of the second embodiment, the structure includes formula (I), $R_1$ and $R_3$ are each independently selected from H, an organic residue and an organometallic residue; $R_2$ includes formula (C), Z and Q are each independently selected from the group consisted of O, $NR_0$, S, $PR_0$, $CR_0R_4$; wherein $R_1$ includes the group —C(=Z)-Q-$R_2$, and $R_0$ and $R_4$ are each independently selected from a hydrogen, an organic residue and an organometallic residue. For example, Q is —$NR_0$—, Z is oxygen.

In a ninth aspect of the second embodiment, the structure includes formula (I), $R_1$ and $R_3$ are each independently selected from H, an organic residue and an organometallic residue; $R_2$ includes one of formulae (B) and (D), Z and Q are each independently selected from the group consisted of O, $NR_0$, S, $PR_0$, $CR_0R_4$, wherein $R_0$ and $R_4$ are each independently selected from H, an organic residue and an organometallic residue.

In a tenth aspect of the second embodiment, the structure includes formula (II), R1 includes one of formulae (A), (B), and (D). For a first example, X is N, Y is $CR_0$, wherein R0 is selected from a hydrogen, an organic residue and an organometallic residue, R1 includes formula (A). For a second example, X, Y, R0 are according to the first example, and R2 includes a conjugated group attached to Y with an atom of $sp^2$ hybridization, and R1 includes formula (B). For a third example, X is $CR_0$, Y is $CR_5$, wherein at least one of $R_2$ and $R_5$ is a conjugated group. For a fourth example, X is $CR_0$, Y is $CR_5$, wherein $R_2$ and $R_5$ collectively forms a ring. For a fifth example, X is N, Y is $CR_5$, wherein $R_2$ and $R_5$ each includes a C=C double bond and collectively forms a ring. For a sixth example, X is N, Y is $CR_5$, wherein $R_2$ and $R_5$ each includes a benzene ring and collectively forms a ring between the two benzene rings.

In an eleventh aspect of the second embodiment, the structure includes formula (II), $R_1$ includes formula (C). For a first example, X1, Z1, X, and Y all include a carbon atom. For a second example, at least one of X1, Z1, X, and Y does not a carbon atom. For a third example, at least one of X1, Z1, X, and Y includes a nitrogen (N) or a phosphorous (P).

In a twelfth aspect of the second embodiment, the structure includes formula (III), $R_1$ and $R_2$ are each independently selected from formulae (A)-(D). In a first sub-aspect, $R_1$ and $R_2$ are both represented by formula (C) wherein the $X_1$=$Z_1$ groups of both $R_1$ and $R_2$ are C=C groups at the same time. In a second sub-aspect, $R_1$ and $R_2$ are not according to the first sub-aspect as described above. In a third sub-aspect, $R_1$ and $R_2$ are both represented by formula (C) and are carbonyls, wherein $Z_1$ is oxygen for both $R_1$ and $R_2$; $X_1$ is $CR_0$ for both $R_1$ and $R_2$, wherein $R_0$ for $R_1$ and $R_2$ are each independently selected from any non-hydrogen organic radicals and organometallic residues. In a fourth sub-aspect, $R_1$ and $R_2$ are both represented by formula (C) and are carbonyls, wherein the $Z_1$ is oxygen for both $R_1$ and $R_2$; $X_1$ is $CR_0$ for both $R_1$ and $R_2$, and $R_3$ for $R_1$ and $R_2$ are each independently selected from an EDG, an EWG, a conjugated group, and an organometallic group. In a fifth sub-aspect, $R_1$ and $R_2$ are both represented by formula (C) and are carbonyls, wherein the $Z_1$ is oxygen for both $R_1$ and $R_2$; $X_1$ is $CR_0$ for both $R_1$ and $R_2$, and $R_3$ for one of $R_1$ and $R_2$ is selected from an EDG, an EWG, a conjugated group, and an organometallic group, and $R_3$ for the other of $R_1$ and $R_2$ is hydrogen, and either $R_0$ for $R_2$ does not include $R_3$ for $R_1$ or $R_0$ for $R_1$ does not include $R_3$ for $R_2$. In a sixth sub-aspect, $R_1$ and $R_2$ both represented by formula (A) and both includes a benzyl group directly attached to each other. In a seventh sub-aspect, $R_1$ is represented by formula (C) and $R_2$ is represented by formula (D). For example, $R_1$ includes an allyl group wherein $Z_1$=$X_1$ is C=C double bond; $R_2$ includes an amide group wherein $X_1$ is $CR_0$, $Z_1$ is oxygen, Q is nitrogen.

In a thirteenth aspect of the second embodiment, the structure includes formula (IV), wherein E is any atom with a lone pair or any conjugated group which connects to $R_1$ with a sp2 or sp hybridized atom; wherein $R_1$ and $R_2$ are each independently selected from formulae (A)-(D). In one sub-aspect, E is selected from $NR_5$ and $PR_5$, wherein $R_5$ is selected from formulae (A)-(D) independent of the choice of $R_1$ and $R_2$, wherein at least one of $R_1$, $R_2$ and $R_5$ is represented by formula (A) and includes a benzyl group directly attached to E. In a second sub-aspect, both $R_1$ and $R_2$ are benzyl group, E is not NH, $NR_1$, $NR_2$, PH, $PR_1$, or $PR_2$, and E is directly attached to a third benzyl group. For first example, both $R_1$ and $R_2$ are benzyl group, E is —P(=O)$R_5$ or —N(=O)$R_5$ and is directly attached to the third benzyl group, wherein $R_5$ is selected from formulae (A)-(D) independent of the choice of $R_1$ and $R_2$. For a second example, E is selected from $NR_5$ and $PR_5$, E is not directly attached to a benzylic carbon of a benzyl group, and at least one of $R_1$ and $R_2$ includes an allyl group, wherein $R_5$ is selected from formulae (A)-(D) independent of the choice of $R_1$ and $R_2$.

In a fourteenth aspect of the second embodiment, the structure includes formula (V) wherein C.G. represents a conjugated group as described above. In a first example, $R_1$ includes formula (A) and C.G. includes a benzene group attached directly to $R_1$. In a second example, $R_1$ includes formula (B) and C.G. includes a double bond attached directly to $R_1$. In a third example, $R_1$ includes formula (C) and C.G. includes an aromatic group attached directly to $R_1$ with one of the members of the aromatic ring. In a fourth example, $R_1$ includes formula (D) and C.G. includes a C=C double bond directly attached to $R_1$.

In a fifteenth aspect of the second embodiment, the structure as described in any one of the above aspects, wherein the structure further includes a ring. In various situations, the structures including a ring may be preferable due to various reasons as described above.

In a sixteenth aspect of the second embodiment, the structure as described in any one of the above aspects, wherein the structure is polymeric.

In a seventeenth aspect of the second embodiment, the structure as described in any one of the above aspects, wherein the structure is dendrimeric.

In an eighteenth aspect of the second embodiment, the structure as described in any one of the above aspects, wherein the structure is a host-guest complex.

In a nineteenth aspect of the second embodiment, the oxidizable additive further includes multiple coordinative sites and further includes a metal ion interacting with at least one of the multiple coordinative sites. In a first sub-aspect, the metal ion is redox-inert. In a second sub-aspect, the metal ion is redox-active. In a third sub-aspect, the metal ion also serves as the oxidation catalyst.

In a twentieth aspect of the second embodiment, the formulation further includes a catalyst. The catalyst is described further in a later section.

In a twenty-first aspect of the second embodiment, the oxidizable additive has an OI higher than approximately 100. In the tenth aspect of the invention, the oxidizable additive has an OOI higher than approximately 100.

In a twenty-second aspect of the second embodiment, the oxidizable additive further includes a C—H bond having a homolytic BDE satisfying a threshold as described in the third embodiment later. It is understood that the oxygen scavenging activity is directly correlated with the homolytic BDE of the weakest bond of the molecule, which, may be affected by the presence of additional components of the composition, as described in more details below. Generally, the lower the BDE is, the weaker the bond is, and the more active the molecule would be in oxygen scavenging.

In a third embodiment, the oxidizable additive includes a C—H bond of a homolytic bond dissociation energy lower than a certain threshold. In other words, when there exists a C—H bond of a homolytic bond dissociation energy less than the threshold, the material may be an oxidizable additive. The threshold depends on the application. For rigid or semi-rigid polyethylene terephthalate container applications, for example, the threshold is approximately 87.5 kcal/mol. If the BDE is too high, for example, higher than approximately 87.5 kcal/mol, the activity of the oxygen scavenger may not be sufficient for the application. Other applications may require a threshold higher or lower than this number. Furthermore, this threshold may be increased or lowered by the presence of certain ingredient. For example, if there exists an oxidation catalyst (e.g. $Co^{2+}$) and the oxidizable additive includes a coordinating site, this threshold may be pushed higher to, for example, about 93 kcal/mol, or in some cases about 98 kcal/mol. Similar effects are present for other threshold values described below and/or for other applications. Conversely, if there exists no oxidation catalyst, the threshold may be substantially lowered to, such as below 77 kcal/mol. If the BDE is too low, the oxidizable additive may not be stable enough to withstand processing condition.

We have compiled a large database of information on BDEs, a portion of which listed below. The molecules are named either by their chemical name, conventional name, or chemical structures representation. The chemical structures, in this paragraph, may include abbreviations, such as: Bn or Ph means phenyl; By means benzyl; Al means allyl; Tn means toluene; DB means $CH_2$=CH—, $B(OH)_3$ means the boric acid; Py means pyridine; C3 means —$CH_2$—$CH_2$—$CH_2$— that forms a ring with other fragment of the molecule; or any other abbreviations recognizable by a person of skill in the art. Allyl~87.2; Toluene~90.0; Asorbic Acid~85.1; Benzene (reported)~113.0; Phenol (O—H) (reported)~88.0; (t-Bu)2Phenol (O—H) (reported)~82.5; benzylphthalamide~88.0; polybutadiene~85.7; N-benzylbenzamide~81.4; N-benzylbenzamide~82.1; dibenzyl urea~88.5; Mandelic Acid~75.5; Mandelide~79.1; Polymandelide~86.1; PLA~94.1; PGA~91.1; dimethylbenzylamine~84.7; semiquinone-benzyl amine condensed~59.8; benzylbenzilidene~76.0; N-methylbenzamide~93.3; N-C5NH10-benzamide~92.1; N-dimethylbenzamide~93.5; methylPhenylacetate~84.9; methylPhenylacetamide~85.7; methylPhenylacetamide~85.4; benzyl benzoate~86.5; dibenzylmethane~84.7; N-allyldimethylimine~73.1; C3 dicarboxylic acid~93.0; benzylacetate~85.0; tetrahydrofuran~93.3; tetrahydrofuran~C1-acetate (C1—H)~97.1; 2-butyne~89.6; C~H in PMHS monomer~100.5; Si—H in PMHS~94.7; Si-H in PMHS (Si3 oligomer)~95.8; CN-substituted PMHS~98.5; NH2-substituted PMHS~96.3; methyl benzoate~97.5; itaconic acid~87.8; BCMOMe (reported)~81.0; BCE (reported)~88.0; BCN (reported)~93.0; CH4 (reported)~105.0; By-SPh (reported)~84.0; Pyrrolidine~92.1; N,N-dimethylpyrrolidine~106.7; Tn-p-NMe+ ~91.9; N-methylpyrole~93.4; N,N-dimethylpyrole~108.0; benzylchloride~86.3; benzylfluoride~88.2; nitrosomethylbenzene~65.2; nitrosomethylbenzene~64.2; Phosphorylmethylbenzene~93.5; dimethylbenzylamine N-oxide~94.5; dimethylbenzylphophine oxide~89.5; N-benzylformamide~82.5; methylbenzylsulfide~83.2; methylbenzylether~89.1; methylbenzylether (method 2)~88.1; Phenylacetylene~79.9; Phenylacetonitrile~82.0; (Nitromethyl)benzene~88.5; dimethylbenzylphosphine~87.8; Benzyltrimethylammonium~96.5; benzylammonium~94.0; Phenylacetaldehyde~83.2; 3-Butenoic acid~80.7; 2-hydroxy-3-Butenoic acid~74.7; hydroxyl allylformate~84.6; 1,4-pentyldiene~73.2; hydroxylallylalcohol~83.1; allylalcohol~79.6; allylammonium~86.6; trimethylallylammonium~89.7; 4,4-difluoro-1-butene~86.1; 4-fluoro-1- butene~85.1; 3-Butenenitrile~79.2; 4,4,4-trifluoro-1-butene~87.5; N-allylimine~75.5; N-allylimine (conformation 2)~74.3; 3-nitroso-1-propylene~63.7; 3-nitro-1-propylene~83.0; allyl acetylene~76.6; Pyridine-p-CH3~91.7; CH3C(=)ONCH2—CN~83.4; HOC(=O)—CH2-CN~90.0; HC(=O)OCH2—C(=O)—OH~90.9; CH3C(=O)CCH2CH2OCH3~97.4; NH2—CH2—CN~81.3; NH2—CH2—OC(=O)H~94.6; NH2-CH2-NH2~93.2; CN—CH2—CN~87.0; CF3—CH2-CF3~106.7; Bn-C(=O)O-Me~97.5; Me-C(=O)O-Me~98.3; MeC(=O)NMe~92.2; tetrahydrofuran-C1-acetate (furan-H)~92.5; Tn-o-COOH~89.7; Tn-m-CN~91.3; Tn-m-CC~90.5; Tn-m-N+=N~93.3; Tn-m-OH~66.5; ~90.6; ~89.3; Tn-m-O—~87.9; Tn-m-NO~108.8; ~90.0; ~110.4; Tn-m-NH2~89.6; Tn-m-N3~90.4; Tn-m-NH3+~92.0; Tn-m-F~90.6; Tn-m-NO2~90.8; Tn-m-C=CH2~89.5; Tn-m-B(OH)3~87.1; Tn-mp-C4~88.8; Tn-mp-C3~90.1; TnmCOO—~88.4; Tn-o,p-CN2~89.5; Tn-CN~89.3; Tn-p-OH~89.8; Tn-p-NO2~90.3; Tn-p-NO~90.9; Tn-p-C=CH2~88.2; Tn-p-OMe~88.7; Tn-p-NMe3+~91.9; Tn-p-NH3+~91.4; Tn-p-B(OH)3~86.5; Tn-p-COOH~90.3; Tn-p-COOH (reported)~89.8; Tn-p-NMe2~85.8; Tn-p-NMe2 (reported)-88.5; Indane (benzylic C—H)~87.7; Tn-p-C(=O)Me~88.0; Tn-o,p-COOH2~89.5; Tn-o-NO~89.1; Benzyl-B(OH)3-CF3~94.1; semiquinone-benzyl amine condensed (method 2)~61.5; N-benzylbenzamide (method 2)~80.3; mandelic acid (method 2)~74.5; benzylbenzilidene (method 2)~72.6; Tn-m,p-Me2~89.3; Tn-m,p-Et2~90.2; benzylbenzoate (method 2)~85.4; Toluene~89.1; Ph-OCH2—H~97.6; DB-OCH2—H~98.6; CH3—C(=O)OCH2CH2OCH3~93.1; Al—O—Al~79.7; TnNH2~89.1; By-OH~83.5; By-B(OH)3~89.1; By-CF3~92.4; Pyd-o-CH3~91.7; Pyd-m-CH3~90.8; Pyd-p-CH3~91.6; CH2=N—CH3~87.9; NH=CH—CH3~91.0; NH=CH—CH2—NH2~77.9; CH2=CH—CH=CH2—CH2—H~80.3; NH2—CH=CH—CH=CH2—CH2—H~77.8; CH2=C(NH2)—CH=CH2—CH2—H~81.1; CN—CH=CH—CH=CH2—CH2—H~78.6; CH2=C(CN)—CH=CH2—CH2—H~81.0; B(OH3)—CH=CH—CH=CH2—CH2—H~76.4; CH2=C(B(OH)3)—CH=CH2—CH2—H~80.0; Tn-m-CF3~91.4; Tn-p-CF3~90.4; (HC(=O)CH2)2~91.2; B(OH)3—CH2—CHF2~101.1; B(OH)3—CH3~100.2; CH3—CHF2~105.2; B(OH)3—CH2—CN~93.9; NH2—CH2—CHF2~94.0; NH2—CH3~92.8; CH3—CN~95.7; CH4~104.8; CH3COOH~98.2; CH3OCOH~99.3; DB-pk~92.3; HC(=O)CH2—H~94.7; BnC(=O)CH2—H~95.7; DBC(=O)CH2—H~94.9; NH2C(=O)CH2—H~98.3; CNC(=O)CH2—H~94.5; C(=O)-DB~77.4; CO—NH2~77.2; dihydrophthalimide~80.9; polybutadiene (different C—H) ~83.7; dihydrophthalimide (method 2)~79.7.

In a first aspect, the oxidizable additive includes a C—H bond of a bond dissociation energy lower than approximately 87.5 kcal/mol, wherein the C—H bond is selected from a benzylic C—H attached to the nitrogen atom of an amide functional group, a benzylic C—H ortho- or para- to an electron-donating group, an allylic C—H attached to the nitrogen atom of an amide functional group, an allylic C—H attached to another allylic carbon, and a benzoate polyglycol ester C—H that is directly attached to the ester group and in proximity of a transition metal catalyst.

In a first sub-aspect, the oxidizable additive is one according to one of the first two embodiments as described above. In a second sub-aspect, the oxidizable additive includes a benzylic C—H of a bond dissociation energy between approximately 87.5 kcal/mol and 83.0 kcal/mol, such as those according to one of the first two embodiments as described above. In a third sub-aspect, the oxidizable additive includes a benzylic C—H of a bond dissociation energy between approximately 83.0 kcal/mol and 79.0 kcal/mol, such as those according to one of the first two embodiments as described above. In a fourth sub-aspect, the oxidizable additive includes a benzylic C—H of a bond dissociation energy lower than approximately 79.0 kcal/mol, such as those according to one of the first two embodiments as described above. In a fifth sub-aspect, the oxidizable additive includes an allylic C—H of a bond dissociation energy between approximately 87.5 kcal/mol and 84.0 kcal/mol, such as those according to one of the first two embodiments as described above. In a sixth sub-aspect, the oxidizable additive includes an allylic C—H of a bond dissociation energy between approximately 84.0 kcal/mol and 82.5 kcal/mol, such as those according to one of the first two embodiments as described above. In a seventh sub-aspect, the oxidizable additive includes an allylic C—H of a bond dissociation energy below approximately 82.5 kcal/mol, such as those according to one of the first two embodiments as described above. In an eighth sub-aspect, the oxidizable additive includes a benzylic C—H ortho- or para- to an electron-donating group and of a bond dissociation energy approximately lower than approximately 87.5 kcal/mol, such as those according to one of the first two embodiments as described above. In a ninth sub-aspect, the oxidizable additive includes a benzoate polyglycol ester C—H that is directly attached to the ester group and in proximity of a transition metal catalyst and of a bond dissociation energy lower than approximately 87.5 kcal/mol, such as those according to one of the first two embodiments as described above.

In a second aspect, the oxidizable additive includes a C—H bond of a bond dissociation energy lower than approximately 87.5 kcal/mol, wherein the C—H bond is selected from other than a benzylic C—H attached to the nitrogen atom of an amide functional group, a benzylic C—H ortho- or para- to an electron-donating group, an allylic C—H attached to the nitrogen atom of an amide functional group, an allylic C—H attached to another allylic carbon, or a benzoate polyglycol ester C—H that is directly attached to the ester group and in proximity of a transition metal catalyst.

In a third aspect, the oxidizable additive includes a C—H bond that has a bond dissociation energy lower than approximately 86 kcal/mol, such as those according to one of the first two embodiments as described above. In a fourth aspect, the oxidizable additive includes a C—H bond that has a bond dissociation energy lower than approximately 85 kcal/mol, such as those according to one of the first two embodiments as described above. In a fifth aspect, the oxidizable additive includes a C—H bond that has a bond dissociation energy lower than approximately 84 kcal/mol, such as those according to one of the first two embodiments as described above. In a sixth aspect, the oxidizable additive includes a C—H bond that has a bond dissociation energy lower than approximately 83 kcal/mol, such as those according to one of the first two embodiments as described above. In a seventh aspect, the oxidizable additive includes a C—H bond that has a bond dissociation energy lower than approximately 82 kcal/mol, such as those according to one of the first two embodiments as described above. In an eighth aspect, the oxidizable additive includes a C—H bond that has a bond dissociation energy lower than approximately 81 kcal/mol, such as those according to one of the first two embodiments as described above. In a ninth aspect, the oxidizable additive includes a C—H bond that has a bond dissociation energy lower than approximately 80 kcal/mol, such as those according to one of the first two embodiments as described above. In a tenth aspect, the oxidizable additive includes a C—H bond that has a bond dissociation energy lower than approximately 79 kcal/mol, such as those according to one of the first two embodiments as described above. In an eleventh aspect, the oxidizable additive includes a C—H bond that has a bond dissociation energy lower than approximately 78 kcal/mol, such as those according to one of the first two embodiments as described above. In a twelfth aspect, the oxidizable additive includes a C—H bond that has a bond dissociation energy lower than approximately 75 kcal/mol, such as those according to one of the first two embodiments as described above. In a thirteenth aspect, the oxidizable additive includes a C—H bond that has a bond dissociation energy lower than approximately 72 kcal/mol, such as those according to one of the first two embodiments as described above. In a fourteenth aspect, the oxidizable additive includes a C—H bond that has a bond dissociation energy lower than approximately 69 kcal/mol, such as those according to one of the first two embodiments as described above. In a fifteenth aspect, the oxidizable additive includes a C—H bond that has a bond dissociation energy lower than approximately 66 kcal/mol, such as those according to one of the first two embodiments as described above. In a sixteenth aspect, the oxidizable additive includes a C—H bond that has a bond dissociation energy lower than approximately 63 kcal/mol, such as those according to one of the first two embodiments as described above. In a seventeenth aspect, the oxidizable additive includes a C—H bond that has a bond dissociation energy lower than approximately 60 kcal/mol, such as those according to one of the first two embodiments as described above.

In an eighteenth aspect of the third embodiment, the formulation further includes a catalyst. The catalyst is described further in a later section.

In a fourth embodiment, the oxidizable additive includes a C—H bond, the homolytic bond cleavage of which produces a radical including C. and with an energy $E_g$ over the energy of the oxidizable additive. The energy gap $E_g$ is smaller than a certain threshold depending on the application. For rigid or semi-rigid polyethylene terephthalate container applications, for example, the threshold is approximately 400 kcal/mol. Other applications may require a threshold higher or lower than this number.

In a first aspect, the C—H bond is selected from a benzylic C—H attached to the nitrogen atom of an amide functional group, a benzylic C—H ortho- or para- to an electron-donating group, an allylic C—H attached to the nitrogen atom of an amide functional group, an allylic C—H attached to another allylic carbon, and a benzoate polyglycol ester C—H that is directly attached to the ester group and in proximity of a transition metal catalyst, wherein the energy gap $E_g$ is smaller than approximately 400 kcal/mol.

In a first sub-aspect, the oxidizable additive is one according to one of the first three embodiments as described above. In a second sub-aspect, the C—H bond is a benzylic C—H wherein the energy gap $E_g$ is smaller than approximately 400 kcal/mol but more than approximately 396 kcal/mol, such as those according to one of the first three embodiments as described above. In a third sub-aspect, the C—H bond is a benzylic C—H wherein the energy gap $E_g$ is smaller than approximately 396 kcal/mol but more than approximately 392 kcal/mol, such as those according to one of the first three embodiments as described above. In a fourth sub-aspect, the C—H bond is a benzylic C—H wherein the energy gap $E_g$ is smaller than approximately 392 kcal/mol, such as those according to one of the first three embodiments as described above.

In a fifth sub-aspect, C—H is an allylic C—H wherein the energy gap $E_g$ is smaller than approximately 400 kcal/mol but more than approximately 397 kcal/mol, such as those according to one of the first three embodiments as described above. In a sixth sub-aspect, the C—H bond is an allylic C—H wherein the energy gap $E_g$ is smaller than approximately 397 kcal/mol but more than approximately 395 kcal/mol, such as those according to one of the first three embodiments as described above. In a seventh sub-aspect, the C—H bond is an allylic C—H wherein the energy gap $E_g$ is smaller than approximately 395 kcal/mol, such as those according to one of the first three embodiments as described above.

In an eighth sub-aspect, the C—H bond is a benzylic C—H ortho- or para- to an electron-donating group wherein the energy gap $E_g$ is smaller than approximately 400 kcal/mol, such as those according to one of the first three embodiments as described above. In a ninth sub-aspect, the C—H bond is a benzoate polyglycol ester C—H that is directly attached to the ester group and in proximity of a transition metal catalyst wherein the energy gap $E_g$ is smaller than approximately 400 kcal/mol, such as those according to one of the first three embodiments as described above.

In a second aspect, the C—H bond is selected from other than a benzylic C—H attached to the nitrogen atom of an amide functional group, a benzylic C—H ortho- or para- to an electron-donating group, an allylic C—H attached to the nitrogen atom of an amide functional group, an allylic C—H attached to another allylic carbon, or a benzoate polyglycol ester C—H that is directly attached to the ester group and in proximity of a transition metal catalyst, wherein the energy gap $E_g$ is smaller than approximately 400 kcal/mol.

In a third aspect, the energy gap $E_g$ is less than approximately 399 kcal/mol, such as those according to one of the first three embodiments as described above. In a fourth aspect, the energy gap $E_g$ is less than approximately 398 kcal/mol, such as those according to one of the first three embodiments as described above. In a fifth aspect, the energy gap $E_g$ is less than approximately 397 kcal/mol, such as those according to one of the first three embodiments as described above. In a sixth aspect, the energy gap $E_g$ is less than approximately 396 kcal/mol, such as those according to one of the first three embodiments as described above. In a seventh aspect, the energy gap $E_g$ is less than approximately 395 kcal/mol, such as those according to one of the first three embodiments as described above. In an eighth aspect, the energy gap $E_g$ is less than approximately 394 kcal/mol, such as those according to one of the first three embodiments as described above. In a ninth aspect, the energy gap $E_g$ is less than approximately 393 kcal/mol, such as those according to one of the first three embodiments as described above. In a tenth aspect, the energy gap $E_g$ is less than approximately 392 kcal/mol, such as those according to one of the first three embodiments as described above. In an eleventh aspect, the energy gap $E_g$ is less than approximately 390 kcal/mol, such as those according to one of the first three embodiments as described above. In a twelfth aspect, the energy gap $E_g$ is less than approximately 388 kcal/mol, such as those according to one of the first three embodiments as described above. In a thirteenth aspect, the energy gap $E_g$ is less than approximately 385 kcal/mol, such as those according to one of the first three embodiments as described above. In a fourteenth aspect, the energy gap $E_g$ is less than approximately 382 kcal/mol, such as those according to one of the first three embodiments as described above. In a fifteenth aspect, the energy gap $E_g$ is less than approximately 379 kcal/mol, such as those according to one of the first three embodiments as described above. In a sixteenth aspect, the energy gap $E_g$ is less than approximately 376 kcal/mol, such as those according to one of the first three embodiments as described above. In a seventeenth aspect, the energy gap $E_g$ is less than approximately 373 kcal/mol, such as those according to one of the first three embodiments as described above. In an eighteenth aspect, the energy gap $E_g$ is less than approximately 370 kcal/mol, such as those according to one of the first three embodiments as described above.

In a nineteenth aspect of the fourth embodiment, the formulation further includes a catalyst. The catalyst is described further in a later section.

In a fifth embodiment of the present invention, alternative to including the oxidizable additive in the formulation, a precursor to the oxidizable additive may be included. The oxidizable additive is according to any of the first four embodiments. The precursor may be primarily in an amorphous state, for example, having a crystallinity of less than 15%. If the crystallinity is too high, such as higher than 15%, it may be too slow or difficult to cause chemical reaction to the precursor. If a precursor is not received in the primarily amorphous state, it may be converted into such a state by any suitable method. For example, it may be heated to a molten state and rapidly cooled (or "quenched") to the ambient or low temperature.

Alternatively, it may be dissolved in a solvent, and be "quenched" out of the solution by the addition of a second solvent. In a first aspect of this embodiment, the precursor turns into one of the oxidizable additives by going through a thermal-induced chemical reaction. For a first example, the thermal-induced chemical reaction occurs during a regular injection-molding process to form, such as, a plastic container. For a second example, the thermal-induced chemical reaction occurs during a reactive extrusion process. Reactive extrusion conditions may be selected by any known methods. Graeme Moad provides an exemplary set of conditions in FIG. 1 and the accompanying description of the journal article known as Macromol. Symp. 2003, 202, 37, entitled "Controlled Synthesis of Block Polyesters by Reactive Extrusion," ("Moad") which is incorporated by reference in its entirety. Gunter Beyer's book entitled "Reactive Extrusion: Principles and Applications" (ISBN: 3527801553), at page 32, provides another set of conditions for reactive extrusion. The entirety of the book is incorporated here by reference. The oligoester of Moad or the ethylene glycol of Beyer may be replaced by a glycol, an amine, polyglycol, polyamine, polyester, polyamide, or combinations thereof, having an oxygen scavenging moiety. Without being limited by the theory, the reaction between these alternative molecules tether the oxygen scavenging moiety onto the polyester by way of hydrolysis, condensation, transesterification, transamidation, and/or transesteramindation reactions, or more generally referred to as "exchange reactions." Accordingly, any catalysts employed to facilitate such reactions are generally referred to as "exchange catalysts." Conditions may be adjusted based on the property of the compositions and following any known principles and methods, such as those principles and methods disclosed in Beyer. For a third example, the thermal-induced chemical reaction occurs independent of and separate from the processing of the formulation. In a first instance for the third example, the thermal-induced chemical reaction occurs in a reactive extrusion process separated from the injection molding. In a second instance for the third example, it occurs in a normal chemical reaction vessel. In a second aspect of this embodiment, the precursor interacts with the base resin to form the oxidizable additive as described in any of the earlier embodiments. For example, the base resin is a polyester, the precursor is an amine-based molecule, such as benzylamine, meta-, ortho-, or para-xylene diamine, and the precursor reacts with the polyester to form an amide-based oxidizable additive. For another example, the base resin is a polyester, and the precursor is an alcohol-based molecule, such as polybutylene glycol oligomer, polymer fragment or co-polymer fragment, which reacts with the polyester to form ester-based oxidizable additive. In both examples, an effective amount of catalyst may or may not be included in the formulation to facilitate the reaction with the base resin. The catalyst may be any proper exchange catalyst for condensation, hydrolysis, transesterification, transamidation, and/or transesteramidation reactions, such as transition metal oxides, hydroxides or alkoxides. For a first instance, the exchange catalyst may be an oxide, hydroxide or alkoxide of titanium, tin, zirconium or the like. Other exchange catalysts may not be as effective. In a third aspect of this embodiment, the precursor turns into the oxidizable additive following external stimulation such as ultraviolet radiation, electron beam radiation, plasma radiation, visible light radiation, etc. In a fourth aspect of this embodiment, the precursor turns into the oxidizable additive following the interaction of the precursor with oxygen. In a fifth aspect of this embodiment, the precursor turns into the oxidizable additive following the interaction with a molecule inside or outside the container, wherein the precursor is embedded inside the wall of the container. For example, the molecule is a water molecule. For another example, the molecule is carbon dioxide. For yet another example, the molecule is an aldehyde molecule produced due to degradation of the base resin or other additives.

Catalyst

Typically, the formulation described above further includes an oxidation catalyst, such as a radical-based catalysts. When the oxidizable additive includes a C—H bond with a BDE that is sufficiently low, however, the oxidation catalyst is optional. The threshold depends on the application. For example, the catalyst may be optional when the C—H bond dissociation energy is lower than 65 kcal/mol. For another example, the catalyst may be optional when the C—H bond dissociation energy is lower than 70 kcal/mol. For yet another example, the catalyst may be optional when the C—H bond dissociation energy is lower than 75 kcal/mol. Without being bound by theory, if the C—H bond dissociation energy is higher than the threshold, there may not be sufficient thermal energy to initiate the radical reaction, therefore, the catalyst is needed to generate that initial radical.

The oxidation catalyst may be any catalyst that facilitates the oxidation of an activated C—H bond. Such catalysts may be any functionable transition metal catalyst known in the art, for example, cobalt, manganese, and iron. Alternatively, a precursor to the oxidation catalyst may be used. The amount of these catalysts or catalyst precursors (hereinafter collectively "catalysts") to be included in the formulation are dependent upon the identity, the amount of the scavenger used, as well as the any additional components that exist in the formulation. For example, to determine the right amount of catalyst $C_A$ for a particular scavenger A at a particular concentration c, a ladder of catalyst concentration is tested in conjunction with A at the reactive condition. This ladder of catalyst concentration may include the catalyst at a concentration of 100 ppb, 200 ppb, 300 ppb, 400 ppb, 500 ppb, 750 ppb, 1 ppm, 2 ppm, 4 ppm, 8 ppm, 16 ppm, 32 ppm, 64 ppm, 100 ppm, 200 ppm, 400 ppm, 800 ppm, etc., as measured by the elemental metal present in the catalyst. The number of the data points, the intervals, and specific concentrations may be selected and adjusted based on experience or specific design of experiment criteria. When certain reactivity is observed at a certain concentration, a second catalyst concentration ladder is designed zooming in around that concentration. For example, if certain reactivity is observed at both 32 ppm and 64 ppm catalyst level, a second catalyst ladder including catalyst concentrations at 24 ppm, 32 ppm, 40 ppm, 48 ppm, 56 ppm, 64 ppm, 72 ppm may be conducted to find the catalyst level corresponding to the highest reactivity. This may be repeated until an optimal concentration is reached. The preparation of these reactions typically involves mixing the scavenger and the right amount of catalyst with or without a carrier. The formulation then goes through the proper processing, such as injection molding, reactive injection molding, extrusion molding, co-extrusion molding processing. Lamination with adhesive tie layers may also be used in certain applications. The samples prepared this way may be tested using any known oxygen permeability or oxygen scavenging characterization methods, such as OxySense, MoCon, or any similar or dissimilar methods. Such processing of the samples are routine in the industry, and the subsequent characterizations may be performed in parallel. These efforts of finding the optimal level shall not be considered undue whether or not the number of experiments is high. Additionally, organocatalysts may be used as the oxidization catalyst. For example, this may include N-hydroxyphthalimide and its radical, phthalimido-N-oxyl and the like. Also, they may be used in conjunction with the transition metal catalysts, such as Co, Fe, Mn as a co-catalyst.

For formulations that do use a catalyst, it is mandatory that the formulation is free of catalyst deactivation species and free of labile bonds that is prone to cleavage leading to the formation of catalyst deactivation species during processing or application. For transition metal-based catalysts, these species include, for example, halogen radicals, strong ligand field ligands, etc. Without being bound by theory, these species interact with and deactivates the transition metal catalyst, thereby killing the reactivities of the formulation. For example, if a cobalt carboxylate is used as a catalyst, the formulation should be free of, e.g. as alkyl chlorides, that generates species (chlorine radicals) capable of interacting with cobalt to form a stabilized form of cobalt. It is rationalized that these stabilized forms of cobalt are not active to interact with molecular oxygen, thus fails as a radical catalyst between oxygen and the oxidizable additive.

Once the target concentration of the oxidation catalyst is optimized, the oxidizable additive and the oxidization catalyst may be processed into the final product with any available methods or technologies known method in the art. For example, melt-blend is one type of processes often used to produce plastics containers, trays, etc. with, for example, injection molding, extrusion molding, stretch blow molding, thermoforming processes, etc. The processes may be optimized, by a person of ordinary skill in the art, to minimize the degradation of the resin and the components to the formulation, while reaching sufficient homogeneity.

In melt-blend processes, the plastic resins and the various components of the formulation is added at the throat of an injection molding machine. The injection molding machine may produce a preform that may be later stretched and blow molded into the shape of a container. Or the machine may instead skip the preform-producing step and form the container in a one-step molding machine. The machine may also produce a film that may be oriented into a film, and a sheet that may be thermoformed into a tray. Containers of different shapes, sizes, mechanical strengths, etc. may be produced. Both single layer and multi-layer construction of these containers may also be achieved. The machine has various parameters that may be tuned to optimize the processing condition for these different applications. In addition to tuning the parameters to produce a conventionally "good" container for packaging purposes, these parameters may further be tuned to enhance the active barrier efficacies of the formulation.

Typically, the melting point and the degradation temperature for all components may be measured in advance by, for example, a differential scanning calorimetry or a thermogravimetric analysis instrument prior to the processing. These temperature parameters may be used to determine the processing conditions. For example, it is generally desirable to maintain the processing temperature of the formulation at the lowest at which all components are in their molten state, taking into consideration the shear energy that is present in the process.

The components of the formulation may be dosed into the throat of an injection molding machine together or separately along with a base resin and other necessary additives, such as a colorant or slip agent. They may also be processed with a resin either together or separately from each other to form masterbatches of a high concentration, wherein the masterbatch is subsequently further processed with additional components and base resins to form the final product. Various physical and chemical interactions and reactions may be occurring during the various processing steps.

Therefore, embodiments of the present disclosure provide oxygen scavenging or absorbing compositions that may be applied to various applications, such as food, beverage, pharmaceutical packaging, consumer commodity packaging, chemical packaging, etc. In one general aspect, the composition includes a polymer at a first weight percentage, a functional component at a second weight percentage, and an oxidation catalyst at a third weight percentage. The functional component is selected from an oxidizable additive and a precursor to the oxidizable additive. The precursor is capable of being converted into the oxidizable additive during processing of the composition at an elevated temperature, such as a melt-processing temperature. The third weight percentage is sufficient to cause the oxidation catalyst to catalyze an oxidation reaction of the oxidizable additive by molecular oxygen during the application of the composition. The second weight percentage is greater than the third weight percentage, and the first weight percentage is greater than a sum of the second and the third weight percentages. The oxidizable additive includes an organic moiety including a first carbon atom (C) attached to a hydrogen atom (H), a first group, a second group, and a third group. The first group includes a conjugated unit selected from a double bond, a triple bond, an aromatic ring. The first group further includes a first anchor atom. The first anchor atom has an $sp^2$ hybridization, an sp hybridization, or a lone pair of valence electrons. The first group is attached to the first carbon atom at the first anchor atom. The second group includes a heteroatom and is selected from a triple bond, a C=N unit, a N=O unit, a first C=O unit attached to the first carbon atom and a second carbon atom, a second C=O unit attached to the first carbon atom and an oxygen, a third C=O unit attached to the first carbon atom and a first nitrogen atom (said first nitrogen atom being attached to a third carbon atom), a first fragment attached to the first carbon atom at an oxygen, a second fragment attached to the first carbon atom at a nitrogen, and a third fragment having at least three heteroatoms within a spatial distance of 4 Å from the first carbon atom (the three heteroatoms includes a nitrogen)—provided that the second group is the third fragment if and only if the first group is an ester attached to the first carbon atom with an ester oxygen or an amide attached to the first carbon atom with an amide nitrogen. The third group is selected from a hydrogen, an alkyl group, an aromatic group, a double bond, a triple bond, and a heteroatom—provided that: when the first group is a benzene or a vinyl, the third group does not form a ring containing the first carbon atom and the first anchor atom; when the first carbon atom is attached to a carbonyl group and an oxygen atom, (1) the oxygen atom is attached to one of hydrogen and a double bond, (2) the first carbon atom is further attached to one of a hydrogen, a double bond, and an oxygen, or (3) the carbonyl group is attached to a double bond; when the first carbon atom is attached to a vinyl and to a chalcogen selected from an oxygen, a sulfur, and a selenium, (1) the chalcogen is attached to one of a heteroatom, a C=C double bond, a triple bond, and a linear alkyl with more than four carbon atoms, (2) the vinyl is attached to one of a heteroatom and a double bond having a heteroatom, or (3) the first carbon is attached to one of a heteroatom and a double bond having a heteroatom; when the first carbon atom is attached to a benzene and an oxygen, the oxygen is attached to a hydrogen, a vinyl, or a carbonyl attached to a vinyl; when the first carbon atom is attached to a benzene or a vinyl and to a nitrogen atom, the nitrogen atom is attached to a carbonyl of an acetylbenzoate (—C(=O)-p-$C_6H_4$—C(=O)—O—) moiety, a linear alkyl having more than 4 carbons, an aromatic group, or an allyl. The composition does not include inhibiting species at an amount sufficient to deactivate the oxidization catalyst.

In an embodiment the composition is food and/or beverage contact acceptable. In an embodiment, the composition is pharmaceutically acceptable. In an embodiment, the first anchor atom is a first $sp^2$ carbon. The first $sp^2$ carbon is part of a vinyl or a benzene. The second group attaches to the first carbon atom at a second $sp^2$ carbon. The second $sp^2$ carbon is a carbonyl carbon of a carbonic acid, an ester, or an amide. In an embodiment, the first carbon atom is attached to a benzene ring, and (1) a carboxylic acid (—COOH) group and a hydroxy (—OH), (2) a first ester group attached to the first carbon with an oxygen and a second ester group attached to the first carbon with a carbon atom, (3) a first amide group attached to the first carbon with a nitrogen and a second amide group attached to the first carbon atom with a carbon atom, or (4) a amine group and an a third amide attached to the first carbon atom with a carbon atom. In an embodiment, the first carbon atom is attached to a benzene or a vinyl, and where the first carbon atom is further attached to a carbonyl. In an embodiment, the first group is a vinyl or a benzene and is attached to a fourth group at the first anchor atom. The fourth group includes a carbonyl unit. In an embodiment, the second group is the C=N unit, and the N of the C=N unit attached to the first carbon atom. In an embodiment, the second group is a N=O unit. The N of the N=O unit is attached to a fourth carbon atom. In an embodiment, the first carbon atom is attached to a benzene or a vinyl and to a nitrogen atom. The nitrogen atom is attached to a carbonyl of an acetylbenzoate (—C(=O)-p-$C_6H_4$—C(=O)—O—) moiety. In an embodiment, the first group is a vinyl or a benzene, and the second group is an acrylate ester oxygen. In an embodiment, the functional component includes the precursor. The precursor includes a functional group or functional groups selected from allyl alcohol, allylamine, benzyl alcohol, benzylamine, and combinations thereof. In an embodiment, the polymer is a polyester, and the functional component includes benzylic amide. The composition further includes a metal-based exchange catalyst. In an embodiment, the first carbon atom and the hydrogen atom form a C—H bond having a homolytic bond dissociation energy of less than about 87.5 kcal/mol. In an embodiment, the oxidizable additive includes an ester or amide of a polyamine or polyetheramine. The first carbon atom is the alpha-carbon to the ester oxygen or amide nitrogen (that is, the first carbon atom directly attached to the ester oxygen or amide nitrogen attached to the carbonyl), and the first carbon atom is within a spatial distance of 4 Å from at least three heteroatoms. In an embodiment, the polymer is a polyester. The functional component is the precursor and includes a polyalkylene glycol, a polyamine, a polyetheramine, a polyester, a polyamide, copolymers thereof, or combinations thereof. The composition further includes a metal-based exchange catalyst at a catalytically-effective amount to catalyze an exchange reaction between the polyester and the precursor.

In one general aspect, the composition also includes a thermoplastic polymer, a functional component selected from an oxidizable additive and a precursor to the oxidizable additive, and a catalytically-effective amount of oxidation catalyst for catalyzing an oxidation reaction of the oxidizable additive by molecular oxygen at a refrigerated, ambient, or near-ambient temperature. The precursor is capable of being converted into the oxidizable additive during processing of the composition at a melt-processing temperature. The oxidizable additive has a formula selected form (I)-(III) below:

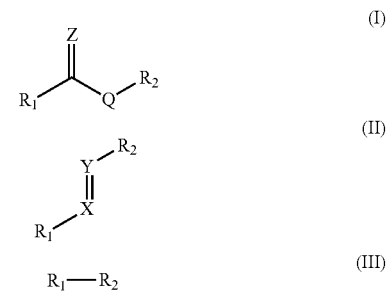

At least one of $R_1$ and $R_2$ includes a fragment selected from the group consisted of formulae (A)-(D):

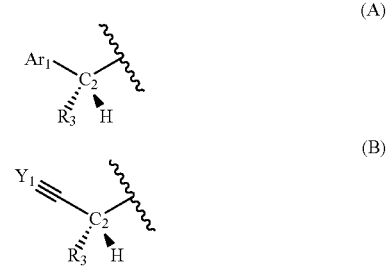

-continued

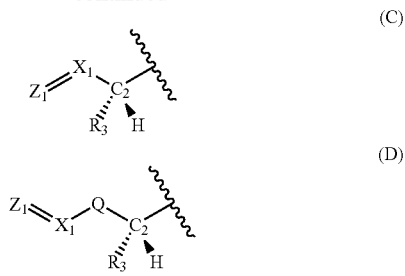

Ar$_1$ may be any organic or organometallic aromatic substituent; R$_3$ may be selected from hydrogen (H), an organic residue, and an organometallic residue; X, Y, X$_1$, and Y$_1$ may each be independently selected from the group consisted of CR$_0$, SiR$_0$, N, P; Z, Q, Z$_1$, are each independently selected from the group consisted of O, S, NR$_0$, PR$_0$. R$_0$ is selected from H, or any organic or organometallic residue. For the structure of (I), when R$_1$ is (A), R$_3$ does not form a ring with C$_2$. For the structure of (II), when R$_1$ is (A) or (C), X is different than Y. For the structure of (III), (1) R$_1$ and R$_2$ are both selected from (A)-(D) and different from each, (2) R$_1$ is selected from (B)-(D) and R$_2$ is selected from a conjugated group, or (3) R$_1$ is selected (D) and R$_2$ includes at least three heteroatoms within a spatial distance of 4 Å from the first carbon atom. The three heteroatoms including a nitrogen. The composition does not comprise inhibiting species at an amount sufficient to deactivate the oxidization catalyst.

In one general aspect, the composition also includes a plastic material, a radical-based catalyst, and an oxygen scavenger. The oxygen scavenger has a first carbon atom attached to a hydrogen forming a C—H bond. The C—H bond has a homolytic bond dissociation energy of less than about 87.5 kcal/mol. The first carbon atom further attached to (1) a strong mesomeric electron-donating group and a strong mesomeric electron-withdrawing group, or (2) a conjugated group and a mesomeric group. The conjugated group is selected from an aromatic group, a double bond, and a triple bond. The mesomeric group is selected from an electron-donating and a mesomeric electron-withdrawing group. The composition also includes where the composition is free of inhibiting species for the radical-based catalyst.

Embodiments of the present disclosure also provide a method of applying the oxygen scavenging or absorbing compositions to various applications. The method includes receiving a first polymer; receiving a precursor to an oxidizable additive; and receiving an oxidation catalyst. The method also includes processing to form a polymer article. The polymer article includes the first polymer at a first weight percentage, the oxidizable additive at a second weight percentage, and the oxidation catalyst at a third weight percentage. The third weight percentage is sufficient to catalyze an oxidation reaction of the oxidizable additive by molecular oxygen at a refrigerated, ambient, or near-ambient temperature. The second weight percentage is greater than the third weight percentage, and the first weight percentage is greater than a sum of the second and the third weight percentages. The oxidizable additive includes an organic moiety including a first carbon atom (C) attached to a hydrogen atom (H), a first group, a second group, and a third group. The oxidizable additive is described above with respect to the first general aspect. The processing does not produce inhibiting species at an amount sufficient to deactivate the oxidization catalyst.

In an embodiment, the first polymer is a first condensation polymer. The precursor is a recycled article of a second condensation polymer. The processing includes processing the oxidizable additive along with the first polymer and the oxidization catalyst at an elevated temperature. The method further includes, before the processing, causing a reaction of a molten form or an amorphous form of the precursor thereby forming the oxidizable additive. In an embodiment, the first polymer is polyethylene terephthalate. The precursor is a polymeric benzylic amide. The processing includes processing with a metal-based exchange catalyst using reactive extrusion to form the oxidizable additive. In an embodiment, the first polymer is a polyester, where the precursor includes an amine group. The processing includes processing with reactive extrusion having a screw design that facilitates increased shear in an early melt-processing zone relative a shear in a late melt-processing zone.

Many examples for the various embodiments described above are commercially available. It should be noted that some of such commercial products include stabilizers which may inhibit their oxygen scavenging activities. Additionally, the polymer resin used as base resin may include inhibiting species which may lead to false negative activity. The synthesis of other molecules above may be achieved via any known methods in the chemistry and materials sciences. It is to be understood that while purity is important to the extent that impurities cannot interfere with the oxidization reactions, i.e. the formulation shall be free of inhibiting species (or stabilizer), mixtures of active molecules or mixtures of an active molecule with inert molecules may not necessarily be non-functional. For example, if a meta-isomer is an active oxidizable additive, and it is known that the para- and ortho-isomers do not inhibit the reactivity, it is acceptable to use a mixture of meta-, para-, and ortho-isomer as the oxidizable additive. Using such a mixture may be advantageous, for example, if the isomers are typically produced in the same reaction as no separation is required. Same applies to many other co-product situations. This aspect alleviates some of the synthetic and/or separation difficulties common to many organic and organometallic reactions.

Many examples for the various embodiments above are commercially available. More examples are provided below for illustrative purposes. They are intended to only be exemplary and shall not be construed to be limiting in any way or form. These representative examples are applicable to other members of the described genus. A person of ordinary skill in the art will be able to make and use embodiments of the invention without undue experimentation.

Example 1: Producing polyethylene terephthalate (PET) plastic container with 3% oxidizable additive and 30 ppm of oxidizable catalyst using a 30-ton BOY 22S injection molding machine.

An appropriate amount of compatible crystallized base PET resin pellets are dried at approximately 120° C. for approximately 15 hours and again at approximately 175° C. for approximately 2 hours immediately prior to use. The purpose of the step is to remove moisture that may be present in the resin pellets. It is generally desired to reduce the moisture level to below 50 parts per million (ppm). A moisture analyzer may be used to verify the level of moisture. Without being bound by theory, it is generally understood that condensation polymers such as PET may degrade at processing condition in presence of large amount of moisture. Other components of the formulation may be dried as appropriate. For example, oxidization catalysts such as cobalt stearate salt is often used in the form of PET masterbatches. These masterbatches may be dried similar to the PET base resins. The oxidizable additives, if present in a form with substantial amount of moisture, may also be dried, preferably under vacuum at a minimal temperature to remove the moisture. However, it is to be understood that a low moisture level in the oxidizable additive or oxidation catalyst may not be necessary or even preferred in all circumstances.

The dried resin pellets are then dosed into the hopper of the injection molding machine. The oxidizable additive and oxidization catalyst are fed into separate feeding ports of the injection molding machine. The barrel is maintained at a temperature of approximately 264° C.; the sprue heater is set at a temperature of approximately 215° C.; the nozzle heater is set at approximately 35% of the power used to heat the barrel; the injection pressure is set at approximately 600 psi (20 sec. of hold pressure; 15 sec. cooling time); and the mold is cooled with process water at a flow rate of approximately 0.5 LPM.

Example 2: Representative example for measuring the activity towards $O_2$ with OxySense.

Plastic containers produced, for example, according to example 1, is cut into small pieces and placed in a sealed glass vial, wherein the vial has a photoluminescent indicator, such as a ruthenium-based dye attached to its glass wall. The ruthenium dye emits light of an intensity according to the concentration of oxygen inside the vial. The light intensity is then monitored at preset time intervals, for example, at 12 hours, 1 day, 3 days, 7 days, 14 days, 30 days, 45 days, and longer if necessary, to generate a curve of oxygen content inside the vial as a function of time. The curvature of the curve is then compared to known functional and non-functional formulations (for example, without the oxidizable additive) to decide the activity of the tested formulation. The storage and monitoring of the samples may be at the operating temperature of the formulation, for example, the room temperature, or alternatively, at a slightly higher temperature, such as 40° C., in order to accelerate the test while not significantly distorting the results.

Examples 3: Synthesis of N-Benzyl-2-phenylacetamide and derivatives thereof. N-Benzyl-2-phenylacetamide is commercially available. The following synthetic procedure is provided such that a person of ordinary skill in the art may modify to optimize the preparation or to derivatize the molecule.

2.0 mmol of methylphenylacetic acid is first dissolved in 20 mL of toluene, to which a 10 mol % of nickel dichloride ($NiCl_2$) is added. The mixture is stirred at 80° C. for 10 min, and 2.4 mmol of benzylamine is added into the vessel. The vessel is then sealed. The mixture is maintained at 110° C. for 20 h while maintaining magnetic stirring. At the end of the reaction, the vessel is cooled. The reaction mixture is discharged and filtered. The filtrate is washed with dilute HCl (1 mol/L) followed by saturated $NaHCO_3$ aqueous solution, and subsequently dried to obtain the product. The solid collected is washed with ethyl acetate to recover the catalyst.

This procedure may be modified and optimized. For example, methylphenylacetate may be used in place of methylphenylacetic acid with slight modification of the procedure. For another example, derivatized methylphenylacetic acids or esters may be used to produce derivatized product, such as those with nitro-, alkyl, acyl, halogen, alkoxy substitutions on the phenyl ring. For yet another example, a different acid or ester may be used as a starting material, such as linear fatty acids. For a further example, derivatized benzylamine may be used, such as those with fluoro substituent on the benzene ring, and xylene diamines.

Examples 4: Synthesis of N-benzylxanthone imine and derivatives thereof.

Xanthone (9.8 g, 50 mmol) and benzylamine (24.6 mL, 225 mmol) are dissolved in toluene (150 mL) and mixed at 0° C. To the mixture, a solution of titanium (IV) chloride (4.1 mL, 37.5 mmol) in toluene (50 mL) is then slowly added. The mixture is stirred at ambient temperature for 30 min, and then heated to reflux and maintained for 6 h. After the mixture is cooled down to room temperature, diethyl ether (200 mL) is added to precipitate the products. The reaction mixture is then filtered through a pad of Celite. The precipitate is washed with diethyl ether (40 mL) three times. The solvent is then removed under reduced pressure. The resulting product is recrystallized from hexane/toluene to produce N-Benzylxanthone imine as a white solid. Other imines (e.g. N-benzylbenzophenone imine) may be prepared with a similar method. Additional derivatization (e.g. alkylation of the benzylic C—H) may be achieved by known chemical method.

Example 5: A formulation that includes a precursor to an oxidizable additive. This example illustrates that an oxidizable additive may be produced during the processing of the formulation.

The injection molding machine is modified with a screw design that has increased shears in an early melt-processing zone, and normal shear in a late melt-processing zone. Meta-xylene diamine (MXDA) is uniformly dispersed in a processing aid, preferably a wax-based processing aid, at a weight percentage of, for example, 30%. Titanium isoproxide is uniformly dispersed in the same processing aid at a weight percentage of, for example, 6%. During the operation, PET resin pellets are fed into the hopper of the injection molding machine. At the same time, the titanium isoproxide dispersion and the MXDA dispersion are each separately fed into the throat of the injection molding machine with peristaltic pumps at appropriate dosing speeds to achieve a target let-down ratio (LDR) of 2% MXDA and 30 ppm Ti. Normal processing conditions are modified such that the screw speed is substantially reduced to allow the precursor to be completely or mostly converted into the oxidizable additive. Vacuum devolatization is provided at one of the ports to remove volatiles. At a late feeding port of the melt-processing zone, cobalt stearate masterbatch is introduced to achieve a target LDR of 30 ppm Co. These parameters may be modified and optimized to achieve maximal uniformity, and further optimized using concentration ladders as described above to achieve the optimized performance. For example, a person of ordinary skill in the art may target to facilitate cross-condensation reaction in the early melt-processing zone based on reactive extrusion guidelines, while guarding against excessive degradations of the components. Additionally and critically, safety precautions shall be taken as flammable volatiles may be produced during the process.

Example 6: A formulation that includes a precursor to an oxidizable additive. This example illustrates that an oxidizable additive may be produced during the processing of the formulation.

The injection molding machine is modified with a screw design that has increased shears in an early melt-processing zone, and normal shear in a late melt-processing zone. Titanium isoproxide is uniformly dispersed in the same processing aid at a weight percentage of, for example, 6%. During the operation, PET resin pellets are fed into the hopper of the injection molding machine. At the same time, the following components are also introduced: (1) the titanium isoproxide dispersion is fed into the throat of the injection molding machine with a peristaltic pump at an appropriate dosing speed to achieve a target let-down ratio (LDR) of 30 ppm Ti; (2) polybutylene glycol is fed into the throat of the injection molding machine with another peristaltic pump at an appropriate dosing speed to achieve a target LDR of 2%. At a late feeding port of the melt-processing zone, cobalt stearate masterbatch is introduced to achieve a target LDR of 30 ppm Co. Normal processing conditions are modified such that the screw speed is substantially reduced to allow the precursor to be completely or mostly converted into the oxidizable additive. Vacuum devolatization is provided at one of the ports to remove volatiles. These parameters shall be modified and optimized to achieve maximal uniformity, and further optimized using concentration ladders as described above to achieve the optimized performance. For example, a person of ordinary skill in the art shall target to facilitate cross-condensation reaction in the early melt-processing zone based on reactive extrusion guidelines, while guarding against excessive degradations of the components. Additionally and critically, safety precautions shall be taken as flammable volatiles may be produced during the process.

Example 7: Synthesis of N,N'-Dibenzyl terephthalamide and functional mixtures thereof.

N,N'-Dibenzyl terephthalamide is commercially available. Below is a method of producing this molecule (or a functional mixture comprising this molecule) from waste or recycled polyesters.

Waste materials, such as those from the municipal recycling facilities are first separated into components. The polyester portion, or ideally, the polyalkylene terephthalate portion, of the resulting waste material is collected, cleaned, dried, and shredded into small pieces with a grinder, pulverizer or the like. Alternatively but preferably, the collected polyester materials go through an extrusion process in which the extrudate is rapidly quenched and cut into small pieces. These small pieces are then added into a flask with excess amount of benzylamine, and optionally with a catalytically active amount of titanium oxide. The mixture is stirred and maintained at a refluxing temperature overnight. White power is produced, collected, washed with ethanol, dried under vacuum and stored over desiccants. It may be used as an oxidizable additive according to one or more embodiments of the present disclosure.

The advantage of this method is partly in that there is no need to separate different types of polyesters, such as between polyethylene terephthalate and polybutylene terephthalate. Both are converted to the same product. Additionally, the reaction is relatively insensitive to the presence of contaminants. For example, polyolefins typically float at the top of the reaction mixture and may be easily separated out without contaminating the final products; and soluble contaminants may be washed away with benzylamine or alcohol washing solutions, both of which may be distilled and recovered. Moreover, other polyesters from the collected waste may produce different, but similarly functional products during the same reaction.

Example 8: Synthesis of N,N'-Dibenzyl terephthalamide and functional mixtures thereof.

This example provides another method of producing this molecule (or a functional mixture comprising this molecule) from waste or recycled polyesters with reactive extrusion. The extruder is first modified to facilitate cross-condensation reactions, including but not limited to, adopting a screw design that enhances shear during the melt-processing. Titanium ethylhexanoate is uniformly dispersed in a parafin wax-based processing aid at a weight percentage of 6%. Polyester material separated from collected waste materials (as described in Example 7) is fed into the hopper of an extruder. Para-xylene diamine (PXDA) and the prepared titanium ethylhexanoate dispersion are each separately fed into the throat of the extrusion machine with a peristaltic pump at appropriate dosing speeds to achieve a target let-down ratio (LDR) of 5% PXDA and 60 ppm Ti. Normal processing conditions are modified such that the screw speed is substantially reduced to allow the polyesters to react with PXDA. Vacuum devolatization is provided at multiple ports to remove volatiles. The extrudate is immediately quenched and pelletized. The product may be used as a polyester masterbatch of N,N'-Dibenzyl terephthalamide capable of being stored and used as an oxidizable additive as necessary. The above parameters shall be modified and optimized to achieve maximal uniformity, and further optimized using concentration ladders as described above to achieve the optimized performance. For example, a person of ordinary skill in the art shall target to facilitate cross-condensation reaction based on reactive extrusion guidelines, while guarding against excessive degradations of the components. Additionally and critically, safety precautions shall be taken as flammable volatiles may be produced during the process.

Example 9: Polyamide as oxidizable additive with reduced haze. Meta-xylene diamine (MXDA) is used as the oxidizable additive at a level of 7% along with cobalt stearate as the oxidization catalyst at a level of 50 ppm. The operating condition is according to Example 1 described above with the exception that (1) a Husky injection molding machine is first used in place of the BOY to produce a preform, which is subsequently converted into a bottle using a Sidel blow-molding machine; (2) the MXD6 pellets, after dried and before being dosed into injection molding machine, is first coated with a thin film of titanium 2-ethylhexanoate by immersion in the solution. The resultant container has reduced haze as compared to formulations in which the MXD6 is not first treated with titanium alkoxide. Alternatively, the titanium 2-ethylhexanoate may instead be separately fed into the throat of the Husky with a peristaltic pump at an optimized speed to achieve the minimized haze.

Example 10: Oligomers and polymers as oxidizable additive. Itaconic acid (IA) is combined with various polyols (trimethylolpropane; sorbitol; 1,4-cyclohexanedimethanol; poly(ethylene glycol); 3-methyl-1,5-pentainediol) with or without the presence of additional diacids (adipic acid or succinic acid). The mixture is then heated to 120-150° C. with thermal or enzymatic polymerization to form oligomers or polymers. This forms copolymers with oxidizable itaconic moiety as a comonomer, therefore is an oxidizable additive.

Example 11: 2-bromo-1-(3-ethyl-5,5,8,8-tetramethyl-5,6,7,8-tetrahydronaphthalen-2-yl)ethan-1-one is commercially available.

Example 12: 1,2,3,4,5,6,7,8,9,10,11,12-dodecahydrotriphenylene is commercially available. It may be used as an oxidizable additive.

Example 13: Synthesis of Benzylidenebenzylamine and derivatives thereof. Benzylidenebenzylamine is commercially available and may also be synthesized as follows. The following synthetic procedure is provided such that a person of ordinary skill in the art may modify to optimize the preparation or to derivatize the molecule, such as by including substituents on the benzene rings of the starting materials. 20 mmol of benzene aldehyde is slowly added to a well-cooled stirred solution of benzylamine (1 eq.) over 30 min at 0° C. The reaction mixture is then allowed to stand till the two layers separated completely. The organic layer is separated and stored over KOH pellets. Precautions shall be taken in handling this product to avoid moisture.

Example 14: Synthesis of Benzylidenebenzylamine oligomer or polymer. Oligomer or polymers counterpart of Benzylidenebenzylamine may be produced using the same method as in Example 13 with the exception that a diamine, such as MXDA, and benzene dialdehyde are used instead. Oligomers and polymers may be preferable due to the reduced migrability. Furthermore, the extended conjugation may provide color-indication.

Example 15: Synthesis of nitrosomethylbenzene and derivatives thereof 1 mmole of N-benzylhydroxylamine is dissolved in 10 ml of previously dried methylene chloride and is cooled at 0° C. 0.85 g of silver carbonate reagent is added into the solution under vigorous stirring. Black precipitates formed over stirring for 10 min at 0° C. The black precipitate is filtered off through a pad of Celite in a frit, and also washed well with ice-cold methylene chloride. The solvent is then evaporated at 0° C. using a rotary evaporator. Cold pentane is used to wash off the benzaldoxime to obtain pure trans-dimeric nitrosomethylbenzene. This material is stored in its crystalline form as a dimer. The product is relatively unstable and is preferred to be stored in crystalline form. It may be dissolved or suspended in a processing carrier, such as polyethylene glycol, at a low temperature immediately before processing, and dosed into the injection molding machine with a peristaltic pump.

Example 16: Synthesis of N-benzyl-4-methoxy-N-methyl-benzenesulfonamide and derivatives thereof. 74 mg of $[MeCN]_4Cu(I)PF_6$ (0.2 mmol, 10 mol %), 44 mg of 1,3-indanedione (0.3 mmol, 15 mol %), and 402 mg of N-methyl 4-methoxybenzenesulfonamide (2.0 mmol, 1.0 eq.) are weighed into a 20 mL vial equipped with a magnetic stir bar. Toluene (5.3 mL, 50 mmol, 25 equiv) is added to dilute the mixture and stirring is maintained at room temperature for 15 min. At the end of the reaction, 1.05 g of $3—CF_3C_6H_4CO_3$-t-Bu oxidant (4.0 mmol, 2.0 equiv) is added via sryinge in a single batch. The vial is fitted with a septum or Teflon-coated cap and purged with nitrogen. The mixture is then stirred at room temperature for 3 days. The resulting mixture is poured into a 125 mL separatory funnel containing 75 mL of aqueous sodium carbonate. The mixture is then extracted with ethyl acetate (30 mL) three times. The combined organic layers are washed with 30 mL of brine and dried over $MgSO_4$. The mixture is then filtered, concentrated under reduced vacuum, and purified by column chromatography through silica gel. A gradient of 100% hexanes to 20% ethyl acetate in hexanes is used as the eluant to separate the target compound as an off-white solid.

Example 17. Exemplary method for reactive extrusion of a polyester and an oxidizable additive having an ester group. Experiments are performed on a JSW TEX 30 twin screw extruder having a 30 mm screw diameter and an overall LID of 42 [comprising ten temperature controlled barrel sections of LID 3.5, three unheated sampling monitoring blocks of L/D 1.167 and a cooled feed block of LID 3.5]. The PET and the oxidizable additive are fed into the extruder using a JSW TTF20 gravimetric feeder and a K-Tron KQX gravimetric feeder respectively. The extruder is operated in co-rotating (intermeshing self wiping) modes with throughputs of between 1 and 5 kg/h. The screw design consists of kneading, conveying and reversing elements as shown in Moad's FIG. 1. Screw speed is routinely set at 155 rpm (40% of motor output). The residence times are 37 minutes for a throughput rate of 1 kg/h, 17 minutes for 2 kg/h and 5 minutes for 5 kg/h. The barrel temperature profile is as shown in Moad's FIG. 1. The melt temperatures and pressures are monitored at three points along the barrel as well as in the die. The extrudate is air-cooled by passage along a conveyor belt and pelletized. The oxidizable additive are melt blended at levels of 5-20 mole % of repeat units with PET. The pellets are injection molded with 80 ppm of cobalt catalyst into plastic articles of chosen shape.

Example 18. The following commercially available molecules have been identified: 1,3-diphenylacetone oxime, Indene, 1,3,5-Tribenzylhexahydro-1,3,5-triazine, 4-Allylanisole, Allylbenzene, 3-Phenyl-1-propyne, Diphenylacetic acid, Itaconic acid, Dimethyl itaconate, 1-Naphthylacetic acid, Homophthalic acid, DL-Mandelic acid, 2-hydroxy-2-phenylacetic acid, 2-Methoxyphenylacetic acid, (3,4-Dimethoxyphenyl)acetic acid, 3,4-Dihydroxyphenylacetic acid, Homophthalic anhydride, ethyl 2-(4-nitrophenyl)acetate, ethyl 4-methoxyphenylacetate, Ethyl 4-chlorophenyl acetate, Ethyl 4-bromophenyl acetate, methyl 4-hydroxyphenylacetate, 3-(benzyloxy)-3-oxo-2-phenylpropanoic acid, Methyl 4-fluorophenylacetate, methyl 9H-xanthene-9-carboxylate, Ethyl 2-methylphenylacetate, Methyl 4-chlorophenylacetate, Methyl 3-chlorophenylacetate, Methyl 3-methylphenylacetate, Methyl 2,6-dichlorophenylacetate, 2-(acetyloxy)-2-phenylacetic acid, BOC-L-alpha-phenylglycine, 2-(acetylamino}-2-phenylacetic acid, BOC—O—alpha-phenylglycine, N-BOC-4-Fluorophenylglycine, 5-phenylimidazolidine-2,4-dione, 3-hexyl-5-phenylimidazolidine-2,4-dione, 3-methyl-5-phenyl-1,3-oxazolane-2,4-dione, 2-Phenylbutyramide, 3-(2-pyridinylmethyl)-1,3-dihydro-2H-indol-2-one, Carbenicillin disodium salt, 9H-xanthene-9-carboxamide, dibenzylmaleate, dibenzylfumarate, 3-(3-methoxyphenyl)-1-methylazepan-2-one, 3-methyl-5-phenyl-1, 3-oxazolane-2,4-dione, benzyl acrylate, 5-bromo-3-hydroxyindolin-2-one, 5-fluoro-3-hydroxylndolln-2-one, Tolazoline hydrochloride, N'-hydroxy-2-phenylethanimidamide, 2-({[(1-benzyl-2-phenylethylidene)amino]oxy}carbonyl)-3-chloro-1-benzothiophene, 2-{[3-({[1-(2-hydroxyphenyl)ethylidene]amino}methyl)benzyl]ethanimidoyl}phenol, 2-[(1,3-benzodioxol-5-ylmethyl)ethani midoyl] phenol, 2-(benzylethanimidoyl)phenol, 1-Naphthylacetic acid, Homophthalic acid, 2-Methoxyphenylacetic acid, (3,4-Dimethoxyphenyl)acetic acid, 3,4-Dihydroxyphenylacetic add, 4-Methoxyphenylacetic acid, 4-Nitrophenylacetic acid, Methyl alpha-bromophenylacetate, 1,3-isochromandione, Ethyl phenylcyanoacetate, Homophthalic anhydride, 4-Hydroxyphenylacetamide, 5-chloroindolin-2-one, 5-bromo-1-methyl-2-oxoindoline, 5-amino-1-methyl-2-oxoindoline, Nl-(2-oxopropyl)-2-phenylacetamide, 6-Bromooxindole, 5-(bromoacetyl)-2-oxoindoline, Benzyl cinnamate, Benzyl benzoate, 4-Vinylbenzyl acetate, gamma-Benzyl L-glutamate, Triallylamine, Benzyl chloroacetate, Vinylacetic acid, trans-Styrylacetic acid, Itaconic anhydride, Methyl 3-hexenoate, 2-(4-isobutylphenyl)propanenitrile, 2-(4-chlorophenyl)-3-oxopropanenitrile, 2,3-diphenylsuccinonitrlle, 2,3-dlphenylpropanenitrlle, Triallyl-s-triazine-2,4,6(1H,3H,5H)-trione, 1,3,5-Benzenetricarboxylic acid triallyl ester, tribenzylamine oxide, tribenzylphosphine oxides, Diallylamine, Diallylmethylamine, Diethyl allylphosphonate, Allyltriphenylphosphonium bromide, Triethyl 4-phosphonocrotonate, Allyltrlphenylphosphonium chloride, Diethyl benzylphosphonate, Benzyltriphenylphosphonium chloride, Malononitrile, Dicyanomethane, 3-oxoindane-1-carboxylic acid.

The above examples are provided merely for illustrative purposes. A person of ordinary skill in the art understands that these examples may be modified in various aspects to optimize the formulation for various different applications without departing from the spirit of the the invention. Additionally, these examples shall not be limited to the contexts in which they are described. Rather, they shall be deemed applicable to those additional applications with similar reactive environments. Other embodiments of the invention, while not specifically described, will become apparent to those skilled in the art from reading the disclosure and applying the disclosure to experiments.

INDUSTRIAL APPLICABILITY

Embodiments of this present disclosure may be used in various packaging applications to extend the shelf life of the contents by (1) reduce initial headspace oxygen and/or (2) impede oxygen ingress. They may be used in food, beverage, drug applications for human and/or animals. They may be used in consumer products and/or chemical packaging. Embodiments of this present disclosure also provide methods that may used associated with the above applications. Embodiments of this present disclosure may also be used in the recycling industry, to convert recycled plastics into oxygen scavengers provided herein.

What is claimed is:

1. A composition, comprising:
a polymer at a first weight percentage;
a functional component selected from an oxidizable additive and a precursor to the oxidizable additive, the functional component at a second weight percentage; and
an oxidation catalyst at a third weight percentage sufficient to catalyze an oxidation reaction of the oxidizable additive by molecular oxygen during the application of the composition,
wherein the precursor is capable of being converted into the oxidizable additive during processing of the composition at an elevated temperature,
wherein the second weight percentage is greater than the third weight percentage, and the first weight percentage is greater than a sum of the second and the third weight percentages,
wherein the oxidizable additive comprises an organic moiety including a first carbon atom (C), the first carbon atom being directly attached to a hydrogen atom (H), and the first carbon atom further being directly attached to:
(1) each of a first group, a second group, and a third group, or
(2) each of a strong mesomeric electron-donating group and a strong mesomeric electron-withdrawing group,
wherein the first group includes a conjugated unit selected from a double bond, a triple bond, an aromatic ring, the first group further includes a first anchor atom, the first anchor atom has an sp$^2$ hybridization, an sp hybridization, or a lone pair of valence electrons, and the first anchor atom of the first group is directly attached to the first carbon atom,
wherein the second group includes a heteroatom and the second group is selected from a triple bond; a C=N unit; a N=O unit; a first C=O unit directly attached to the first carbon atom and directly attached to a second carbon atom; a second C=O unit directly attached to the first carbon atom and directly attached to an oxygen; a third C=O unit directly attached to the first carbon atom and directly attached to a first nitrogen atom, said first nitrogen atom being directly attached to a third carbon atom; a first fragment directly attached to the first carbon atom at an oxygen; a second fragment directly attached to the first carbon atom at a nitrogen; and a third fragment having at least three heteroatoms within a spatial distance of 4 Å from the first carbon atom, the at least three heteroatoms including a nitrogen, provided that the second group is the third fragment if and only if the first group is an ester directly attached to the first carbon atom with an ester oxygen or an amide directly attached to the first carbon atom with an amide nitrogen,
wherein the third group is selected from a hydrogen, an alkyl group, an aromatic group, a double bond, a triple bond, and a heteroatom, provided that:
when the first group is a benzene or a vinyl, the third group does not form a ring containing the first carbon atom and the first anchor atom,
when the first carbon atom is directly attached to a carbonyl group and directly attached to an oxygen atom, (1) the oxygen atom is directly attached to one of hydrogen and a double bond, (2) the first carbon atom is further directly attached to one of a hydrogen, a double bond, and an oxygen, or (3) the carbonyl group is directly attached to a double bond,
when the first carbon atom is directly attached to a vinyl and to a chalcogen selected from an oxygen, a sulfur, and a selenium, (1) the chalcogen is directly attached to one of a hydrogen, heteroatom, a triple bond, and a linear alkyl with more than four carbon atoms, or (2) the first carbon is directly attached to one of a heteroatom separated from the chalcogen, and a double bond having a heteroatom separated from the chalcogen,
when the first carbon atom is directly attached to a benzene and directly attached to an oxygen, (1) the oxygen is part of the first group, the second group, or the third group, and the oxygen is directly attached to one of a hydrogen, a vinyl, and a carbonyl directly attached to a vinyl, or (2) the first carbon atom is directly attached to a carbonyl group and the carbonyl group is part of the first group, the second group, or the third group,
when the first carbon atom is directly attached to a benzene or a vinyl and directly attached to a nitrogen atom, (1) the nitrogen atom is directly attached to a carbonyl of an acetylbenzoate (—C(=O)-p-C$_6$H$_4$—C(=O)—O—) moiety, directly attached to one of a linear alkyl having more than 4 carbons, an aromatic group, and an allyl, or (2) the first carbon atom is further directly attached to a carbonyl group,
wherein the strong mesomeric electron-donating group is selected from a phenoxide (—O$^-$) group, an amine (—NR$_2$, —NHR, —NH$_2$) group, an ether (—OR) group, and a hydroxy (—OH) group, and
wherein the strong mesomeric electron-withdrawing group is selected from a cyano (CN) group, a triflyl (—SO$_2$CF$_3$) group, a sulfonate (—SO$_3$H) group, and a nitro (—NO$_2$) group.

2. The composition of claim 1, wherein the first anchor atom is a first sp$^2$ carbon, the first sp$^2$ carbon being part of a vinyl or a benzene, and
wherein the second group directly attaches to the first carbon atom at a second sp$^2$ carbon, the second sp$^2$ carbon being a carbonyl carbon of a carbonic acid, an ester, or an amide.

3. The composition of claim 1, wherein the first carbon atom is directly attached to a benzene ring, and (1) a carboxylic acid (—COOH) group and a hydroxy (—OH), (2) a first ester group directly attached to the first carbon with an oxygen and a second ester group directly attached to the first carbon with a carbon atom, (3) a first amide group directly attached to the first carbon with a nitrogen and a second amide group directly attached to the first carbon atom with a carbon atom, or (4) an amine group and a third amide directly attached to the first carbon atom with a carbon atom.

4. The composition of claim 1, wherein the first carbon atom is directly attached to a benzene or a vinyl, and wherein the first carbon atom is further directly attached to a carbonyl.

5. The composition of claim 1, wherein the functional component is selected from mandelic acid, mandelide, polymandelic acid, and polymandelide.

6. The composition of claim 1, wherein the first group is a vinyl and is directly attached to a fourth group at the first anchor atom, the fourth group including a carbonyl unit.

7. The composition of claim 1, wherein the second group is the C=N unit, the N of the C=N unit directly attached to the first carbon atom.

8. The composition of claim 1, wherein the second group is a N=O unit.

9. The composition of claim 1, wherein first carbon atom is directly attached to a benzene or a vinyl and to a nitrogen atom, the nitrogen atom is directly attached to a carbonyl of an acetylbenzoate (—C(=O)-p-$C_6H_4$—C(=O)—O—) moiety.

10. The composition of claim 1, wherein the first group is a vinyl or a benzene, and the second group is an acrylate ester oxygen.

11. The composition of claim 1, wherein the functional component includes the precursor, and wherein the precursor includes a functional group or functional groups selected from allyl alcohol, allylamine, benzyl alcohol, benzylamine, and combinations thereof.

12. The composition of claim 1, wherein the polymer is a polyester, the functional component includes benzylic amide, the composition further comprising a metal-based exchange catalyst configured to catalyze an exchange reaction between the polyester and the functional component.

13. The composition of claim 1, wherein the first carbon atom and the hydrogen atom form a C—H bond having a homolytic bond dissociation energy of less than about 87.5 kcal/mol.

14. The composition of claim 1, wherein the oxidizable additive includes an ester or amide of a polyamine or polyetheramine, wherein the first carbon atom is part of an alkoxy group of the ester or part of an amine group of the amide, and the first carbon atom is within a spatial distance of 4 Å from at least three heteroatoms.

15. The composition of claim 1, wherein the polymer is a polyester, the functional component is the precursor and includes a polyalkylene glycol, a polyamine, a polyetheramine, a polyester, a polyamide, copolymers thereof, or combinations thereof, and the composition further comprises a metal-based exchange catalyst at a catalytically-effective amount to catalyze an exchange reaction between the polyester and the precursor.

16. The composition of claim 1, wherein the second group is selected from a nitrile group, an isonitrile group, and a C≡C triple bond.

17. The composition of claim 1, wherein the second group is a double bond having a nitrogen.

18. A method for producing a molecule having the organic moiety of claim 1, comprising:
(1) subjecting a polymer precursor to a thermal-induced chemical reaction with a reactant to produce the molecule, the reactant being a glycol, an amine, polyglycol, polyamine, polyester, polyamide, or combinations thereof and having the organic moiety;
(2) subjecting a base resin to an amine-based precursor to form the molecule, the organic moiety being amide-based; or
(3) subjecting a base resin to an alcohol-based precursor to form the molecule, the the organic moiety being ester-based.

19. The method of claim 18, comprising option (1), wherein the polymer precursor is a material of a used plastic article.

20. The method of claim 18, wherein each of the polymer precursor and the base resin is waste or recycled polyethylene terephthalate (PET).

* * * * *